(12) United States Patent
Hase et al.

(10) Patent No.: US 8,678,977 B2
(45) Date of Patent: Mar. 25, 2014

(54) CONTROL DEVICE

(75) Inventors: Shigekazu Hase, Nishio (JP); Hiroya Ueno, Anjo (JP); Nobuaki Inagaki, Nishio (JP); Nobuhiro Iwai, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 570 days.

(21) Appl. No.: 13/053,780

(22) Filed: Mar. 22, 2011

(65) Prior Publication Data

US 2011/0239804 A1 Oct. 6, 2011

(30) Foreign Application Priority Data

Apr. 2, 2010 (JP) ................................. 2010-086554

(51) Int. Cl.
*B60W 10/08* (2006.01)
*B60W 10/10* (2012.01)

(52) U.S. Cl.
USPC .......................................................... 477/115

(58) Field of Classification Search
CPC ....... B60W 10/08; B60W 10/10; F16H 59/14; F16H 61/0213; F16H 61/08; F16H 2061/0407
USPC ........................................... 477/15, 115, 156
See application file for complete search history.

(56) References Cited

U.S. PATENT DOCUMENTS

| | | | |
|---|---|---|---|
| 2001/0003109 A1* | 6/2001 | Tabata | 477/5 |
| 2006/0276302 A1* | 12/2006 | Sakamoto et al. | 477/107 |
| 2007/0191184 A1* | 8/2007 | Kuwahara et al. | 477/115 |
| 2009/0088291 A1* | 4/2009 | Kumazaki et al. | 477/35 |
| 2010/0173745 A1 | 7/2010 | Hase et al. | |
| 2010/0174429 A1 | 7/2010 | Hase et al. | |

FOREIGN PATENT DOCUMENTS

| | | |
|---|---|---|
| JP | A-04-224360 | 8/1992 |
| JP | A-2000-097330 | 4/2000 |
| JP | A-2002-130453 | 5/2002 |
| JP | A-2003-042284 | 2/2003 |
| JP | A-2007-092813 | 4/2007 |
| WO | WO 2010/079665 A1 | 7/2010 |
| WO | WO 2010/079714 A1 | 7/2010 |

OTHER PUBLICATIONS

May 17, 2011 International Search Report issued in PCT/JP2011/054337 (with translation).

* cited by examiner

*Primary Examiner* — Edwin A Young
(74) *Attorney, Agent, or Firm* — Oliff PLC

(57) ABSTRACT

A control device for controlling a transmission device configured such that when the speed change mechanism performs switching to a shift speed with a different speed ratio, special speed change control is executed in which a disengagement hydraulic pressure, is lowered to cause a disengagement element to slip, and in which the disengagement element is maintained in a slipping state over an entire speed change process. In the case where slipping of the disengagement element is not detected within a predetermined time after the disengagement hydraulic pressure is lowered at start of the special speed change control, pressure increase correction is performed in which an engagement hydraulic pressure, which is a hydraulic pressure of hydraulic oil for an engagement element that is a friction engagement element to be engaged, is raised until slipping of the disengagement element is detected.

13 Claims, 17 Drawing Sheets

F I G . 11
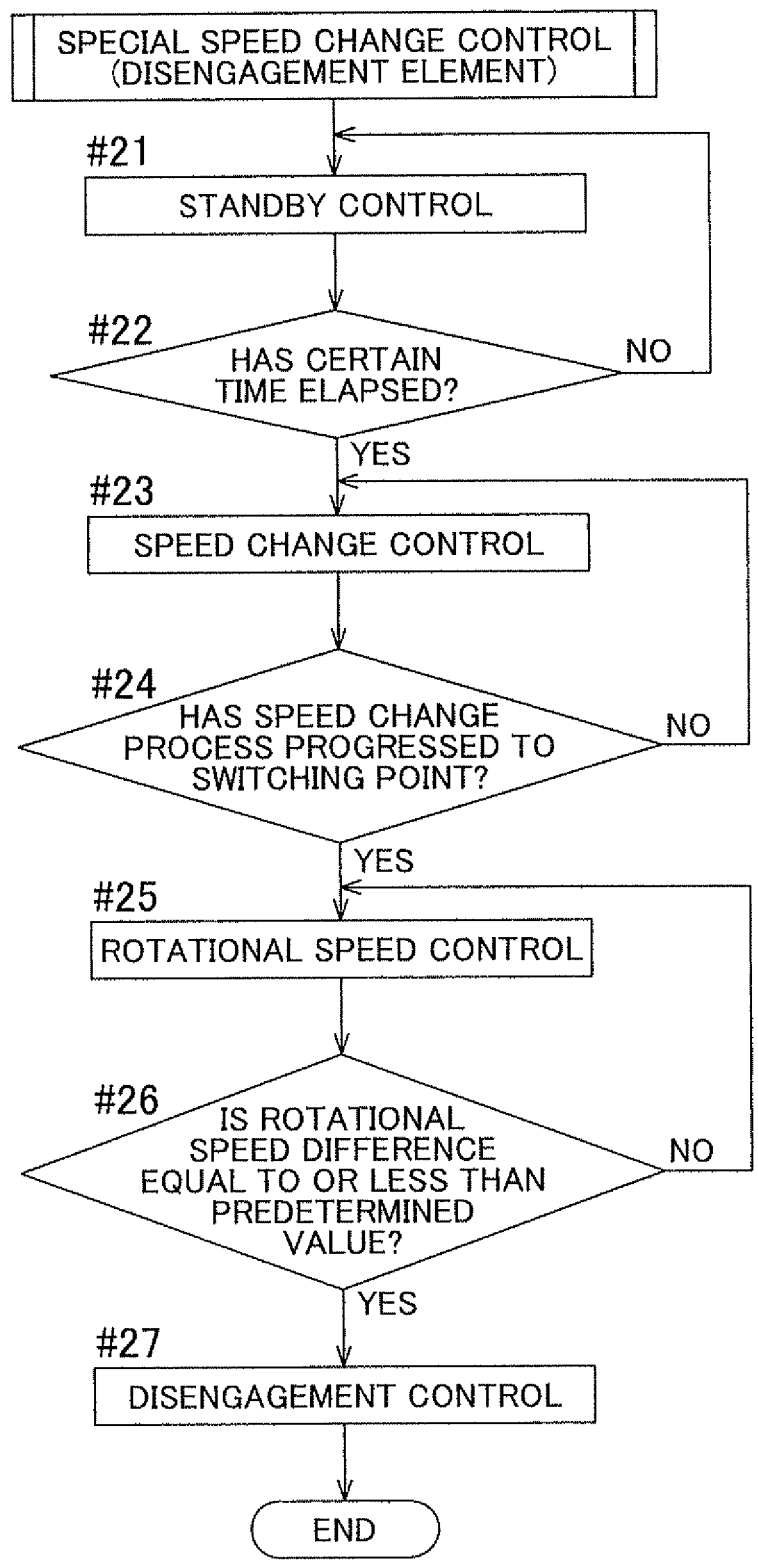

CONTROL DEVICE

INCORPORATION BY REFERENCE

The disclosure of Japanese Patent Application No. 2010-086554 filed on Apr. 2, 2010 including the specification, drawings and abstract is incorporated herein by reference in its entirety.

BACKGROUND OF THE INVENTION

The present invention relates to a control device for controlling a transmission device including an input member drivably coupled to a drive force source, an output member drivably coupled to wheels, and a speed change mechanism that has a plurality of friction engagement elements that are controllably engaged and disengaged to switch between a plurality of shift speeds, and that outputs rotation of the input member to the output member while changing the rotational speed with a speed ratio of each shift speed.

DESCRIPTION OF THE RELATED ART

A vehicle drive device including a transmission device having an input member drivably coupled to an engine serving as a drive force source, an output member drivably coupled to wheels, and a speed change mechanism that has a plurality of friction engagement elements that are controllably engaged and disengaged to switch between a plurality of shift speeds, and that outputs rotation of the input member to the output member while changing the rotational speed with a speed ratio of each shift speed is described in Japanese Patent Application Publication No. JP-A-2002-130453 and known in the art. A control device that controls the device described in Japanese Patent Application Publication No. JP-A-2002-130453 is configured to execute, during a so-called off upshift, disengagement friction engagement element control in which the hydraulic pressure of hydraulic oil for a disengagement element, which is a friction engagement element to be disengaged, is switched between a disengagement securing pressure at which the disengagement element is immediately before starting to be engaged, and an engagement securing pressure at which the disengagement element is slightly engaged. In this case, the disengagement element is brought to a half engaged slipping state (a slipping state) with the hydraulic pressure of hydraulic oil for the disengagement element kept at the engagement securing pressure. By executing such disengagement friction engagement element control, the device described in Japanese Patent Application Publication No. JP-A-2002-130453 can immediately transition into a downshift operation when it is determined to perform a downshift (switching to a shift speed with a higher speed ratio) during an off upshift. Thus, in general transmission devices, the disengagement element is occasionally controlled to the slipping state during a speed change operation for various purposes.

SUMMARY OF THE INVENTION

In the case where the disengagement element is brought to the slipping state during a speed change operation, the output member and the input member are engaged with each other via the disengagement element with a high engagement pressure to be drivably coupled to each other continuously for a long period, compared to a case where the disengagement element is completely disengaged relatively quickly in the initial stage of a speed change operation as in a normal engagement/disengagement shift. Therefore, the rotational speed of the input member may be unlikely to vary to extend the speed change time uselessly. When the speed change time is extended to be long, shift feeling may be deteriorated. Such a problem tends to occur especially in the case where the hydraulic pressure of hydraulic oil for an engagement element, which is a friction engagement element to be engaged, is low because of variations in individual quality, for example, because the rotational speed of the input member cannot be sufficiently increased or reduced via the engagement element.

In view of the foregoing, it is desirable to suppress deterioration of shift feeling by suppressing prolongation of a speed change time even in the case where a disengagement element is brought to a slipping state during a speed change operation.

In order to achieve the foregoing object, a first aspect of the present invention provides a control device for controlling a transmission device that includes an input member drivably coupled to a drive force source, an output member drivably coupled to wheels, and a speed change mechanism that has a plurality of friction engagement elements that are controllably engaged and disengaged to switch between a plurality of shift speeds, and that outputs rotation of the input member to the output member while changing a rotational speed with a speed ratio of each shift speed. The control device has a characteristic structure in which when the speed change mechanism performs switching to a shift speed with a different speed ratio, special speed change control is executed in which a disengagement hydraulic pressure, which is a hydraulic pressure of hydraulic oil for the disengagement element that is a friction engagement element to be disengaged, is lowered to cause a disengagement element to slip, and in which the disengagement element is maintained in a slipping state over an entire speed change process, which extends from a time point when the disengagement element starts slipping to a time point when a rotational speed obtained by multiplying a rotational speed of the output member by a speed ratio after the switching between shift speeds is synchronized with a rotational speed of the input member, and in the case where slipping of the disengagement element is not detected within a predetermined time after the disengagement hydraulic pressure is lowered at start of the special speed change control, pressure increase correction is performed in which an engagement hydraulic pressure, which is a hydraulic pressure of hydraulic oil for an engagement element that is a friction engagement element to be engaged, is raised until slipping of the disengagement element is detected.

In the present invention, the term "slipping state" means a half engaged state between a completely engaged state and a completely disengaged state, and more specifically means a state in which a drive force is transferred between engagement members on both sides of the subject friction engagement element with a predetermined difference between rotational speeds of the input-side rotary member and the output-side rotary member.

The term "rotary electric machine" refers to any of a motor (electric motor), a generator (electric generator), and a motor generator that functions as both a motor and a generator as necessary.

The term "drivably coupled" refers to a state in which two rotary elements are coupled to each other in such a way that allows transfer of a drive force, which includes a state in which the two rotary elements are coupled to each other to rotate together with each other, and a state in which the two rotary elements are coupled to each other via one or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction clutch and a meshing type clutch, for example.

According to the first aspect, the pressure increase correction is performed to raise the engagement hydraulic pressure in the case where slipping of the disengagement element is not detected within a predetermined time after the disengagement hydraulic pressure is lowered. This promotes the rotational speed of the input member to vary, which can cause the rotational speed of the input member to vary early and the speed change process to start early compared to a case where such pressure increase correction is not performed. Hence, it is possible to suppress deterioration of shift feeling by suppressing prolongation of the speed change time after the disengagement hydraulic pressure starts being lowered to bring the disengagement element to the slipping state.

According to a second aspect of the present invention, in the pressure increase correction, the engagement hydraulic pressure may be raised with respect to an engagement reference hydraulic pressure serving as a reference value of the engagement hydraulic pressure during the special speed change control, and after slipping of the disengagement element is detected, the engagement hydraulic pressure be lowered to the engagement reference hydraulic pressure before termination of the speed change process.

In the case where the pressure increase correction is performed to raise the engagement hydraulic pressure with respect to the engagement reference hydraulic pressure, relatively high torque is transferred via the engagement element. Thus, the possibility that the engagement element and the disengagement element are engaged at the same time (a tie-up rate) may become high to deteriorate shift feeling depending on the magnitude of torque transferred via the disengagement element.

According to the second aspect, after slipping of the disengagement element is detected, the engagement hydraulic pressure is lowered back to the engagement reference hydraulic pressure before the termination of the speed change process. Thus, an excessive rise in tie-up rate is suppressed to suppress deterioration of shift feeling. Hence, it is possible to suppress deterioration of shift feeling from two aspects, namely by shortening the speed change time by performing the pressure increase correction and by suppressing a rise in tie-up rate by reducing the engagement hydraulic pressure by an amount by which the engagement hydraulic pressure has been raised through the pressure increase correction.

According to a third aspect of the present invention, the engagement hydraulic pressure may be gradually lowered in accordance with a predicted time from a current time point to a predetermined pressure increase termination time point set before the termination of the speed change process such that the engagement hydraulic pressure becomes the engagement reference hydraulic pressure at the pressure increase termination time point.

According to the third aspect, an increased amount of the engagement hydraulic pressure through the pressure increase correction can be reliably eliminated by the pressure increase termination time point before the termination of the speed change process, by lowering the engagement hydraulic pressure at each time point in the speed change process in accordance with the predicted time from that time point to the pressure increase termination time point. According to the third aspect, in addition, at a time point when slipping of the disengagement element is detected, the engagement hydraulic pressure has been increased through the pressure increase correction, and the variation rate of the rotational speed of the input member over time is relatively high. Thus, the predicted time from such a time point to the pressure increase termination time point is reduced relatively rapidly. Hence, even in the case where the start of slipping of the disengagement element is delayed, the speed change time after the disengagement element starts slipping can be shortened to suppress prolongation of the speed change time as a whole.

According to a fourth aspect of the present invention, a target rotational speed variation rate of the input member may be determined on the basis of a target speed change time set in advance and representing a target time within which the switching between shift speeds is to be performed and a rotational speed variation range representing a difference between rotational speeds of the input member before and after the switching between shift speeds, and the engagement reference hydraulic pressure be varied in coordination with a decrease in the disengagement hydraulic pressure such that an actual rotational speed variation rate of the input member follows the target rotational speed variation rate.

According to the fourth aspect, the speed change operation can be terminated appropriately within the target speed change time by compensating for variations in rotational speed of the input member, which tend to be slow when the disengagement element is maintained in the slipping state, by varying the engagement hydraulic pressure in accordance with the engagement reference hydraulic pressure.

According to a fifth aspect of the present invention, the transmission device may include a rotary electric machine serving as the drive force source, a reference hydraulic pressure variation amount required to vary the rotational speed of the input member at the target rotational speed variation rate be determined on the basis of the target rotational speed variation rate, and the engagement reference hydraulic pressure be varied in accordance with a degree of progress of the speed change process and output torque of the rotary electric machine on the basis of the reference hydraulic pressure variation amount.

As the absolute value of the torque (power-running torque, regenerative torque) output by the rotary electric machine is smaller, the rotational speed of the input member tends to vary more slowly by maintaining the disengagement element in the slipping state. In the case where such variations in rotational speed of the input member are compensated for with variations in engagement hydraulic pressure, such compensation is preferably executed from the initial stage of the speed change process.

According to the fifth aspect, the engagement reference hydraulic pressure can be varied appropriately in accordance with the degree of progress of the speed change process and the output torque of the rotary electric machine. Further, by varying the engagement hydraulic pressure on the basis of the reference hydraulic pressure variation amount, the rotational speed of the input member can be varied at the target rotational speed variation rate to appropriately terminate the speed change operation within the target speed change time.

More specifically, according to a sixth aspect of the present invention, the engagement reference hydraulic pressure may be varied, with reference to the engagement hydraulic pressure at start of the speed change process, on the basis of a predetermined variation coefficient, which is set in advance in accordance with the degree of progress of the speed change process and the output torque of the rotary electric machine, and the reference hydraulic pressure variation amount, and the variation coefficient be set to a value that becomes larger as the speed change process progresses in at least a first stage of a plurality of stages set in accordance with the degree of progress of the speed change process, and that becomes smaller as the speed change process progresses in at least a last stage of the plurality of stages.

According to the sixth aspect, the variation coefficient is set to become larger as the speed change process progresses in the first stage of the plurality of stages set in accordance with the degree of progress of the speed change process, and to become smaller as the speed change process progresses in the last stage of the plurality of stages. Thus, in the first stage where there is a strong demand to compensate for variations in rotational speed of the input member, the engagement hydraulic pressure can be raised to appropriately compensate for such variations in rotational speed of the input member. In the last stage, meanwhile, the engagement hydraulic pressure can be lowered to suppress excessive variations in rotational speed of the input member.

According to the above sixth aspect, moreover, the engagement hydraulic pressure can be varied appropriately in accordance with the engagement reference hydraulic pressure on the basis of the variation coefficient, which matches the degree of progress of the speed change process and the output torque of the rotary electric machine, and the reference hydraulic pressure variation amount through a relatively simple computation.

According to a seventh aspect of the present invention, in the special speed change control, the disengagement hydraulic pressure may be restricted to be equal to or less than a disengagement upper limit hydraulic pressure set as an upper limit value of the disengagement hydraulic pressure during the special speed change control.

According to the seventh aspect, the disengagement hydraulic pressure can be maintained at the disengagement upper limit hydraulic pressure or less over the entire speed change process. By setting the disengagement upper limit hydraulic pressure to a pressure that maintains the tie-up rate at a predetermined value or less, for example, it is possible to suppress deterioration of shift feeling due to a rise in tie-up rate over the entire speed change process.

According to an eighth aspect of the present invention, the transmission device may include a rotary electric machine serving as the drive force source, and variation rate control is executed in which the disengagement hydraulic pressure is reduced at a pressure reduction variation rate matching a magnitude of the output torque of the rotary electric machine.

According to the eighth aspect, abrupt variations in rotational speed of the input member can be suppressed by performing relatively simple control in which the disengagement hydraulic pressure is gradually reduced to gradually increase the amount of slipping of the disengagement element. At this time, the magnitude of the rotational drive force transferred from the output member required to gently vary the rotational speed of the input member differs in accordance with the magnitude of the output torque of the rotary electric machine serving as a drive force source. Thus, occurrence of a speed change shock can be suppressed by appropriately varying the rotational speed of the input member by varying the pressure reduction variation rate for reducing the disengagement hydraulic pressure in accordance with the magnitude of the output torque of the rotary electric machine.

According to a ninth aspect of the present invention, the transmission device may include a rotary electric machine serving as the drive force source, in an initial stage of the speed change process, variation rate control be executed in which the disengagement hydraulic pressure is reduced at a pressure reduction variation rate matching a magnitude of the output torque of the rotary electric machine, and after the variation rate control is executed, and at and after a predetermined switching point, rotational speed control be executed in which the disengagement hydraulic pressure is varied such that the rotational speed of the input member becomes a target rotational speed at each time point after the variation rate control.

According to the ninth aspect, in the initial stage of the speed change process, abrupt variations in rotational speed of the input member can be suppressed by performing relatively simple control in which the disengagement hydraulic pressure is gradually reduced to gradually increase the amount of slipping of the disengagement element. In the latter stage of the speed change process after the predetermined switching point, meanwhile, abrupt variations in rotational speed of the input member can be suppressed by appropriately varying the rotational speed of the input member at each time point by precisely controlling and sequentially varying the disengagement hydraulic pressure in accordance with the target rotational speed. Thus, occurrence of a speed change shock can be suppressed through relatively simple control as a whole.

In this case, the predetermined switching point is preferably set on the basis of the rotational speed of the input member, the time from the start of the variation rate control, the level of the disengagement hydraulic pressure, or the like.

According to a tenth aspect of the present invention, the transmission device may include, as the drive force source, a rotary electric machine capable of producing regenerative torque on the basis of a request to decelerate a vehicle, and the special speed change control be executed during off-upshift regeneration in which the speed change mechanism performs switching to a shift speed with a lower speed ratio in a small acceleration operation amount state where an accelerator operation amount of the vehicle is equal to or less than a predetermined value, and in a state where the rotary electric machine produces regenerative torque.

According to the tenth aspect, the special speed change control is executed during the off-upshift regeneration. As a result, it is possible to maintain a state in which a part of the rotational drive force from the output member is transferred to the input member via the disengagement element over the entire speed change process. Therefore, even in the case where the rotary electric machine is outputting relatively high negative torque during the off-upshift regeneration, abrupt variations in rotational speed of the input shaft can be suppressed because of the rotational drive force transferred from the output member, compared to a case where a normal engagement/disengagement shift is performed so that the disengagement element is completely disengaged relatively quickly in the initial stage of the speed change process, for example. Hence, occurrence of a speed change shock can be suppressed compared to such a case. In this event, the off-upshift regeneration can be performed with no particular restriction on the magnitude of the regenerative torque produced by the rotary electric machine. Hence, the energy efficiency can be maintained high without causing an inconvenience such as a reduction in energy to be regenerated. That is, it is possible to both suppress occurrence of a speed change shock and improve the energy efficiency.

According to the characteristic configuration of the present invention, as has been described so far, in the case where slipping of the disengagement element is not detected within a predetermined time after the disengagement hydraulic pressure is lowered, the pressure increase correction is performed to raise the engagement hydraulic pressure in order to start the speed change process early. Hence, the energy efficiency can be improved early while suppressing occurrence of a speed change shock. Thus, the control device according to the present invention executes the special speed change control particularly suitably in a situation where the transmission device including, as a drive force source, the rotary electric machine capable of producing regenerative torque on the basis of a request to decelerate the vehicle performs the off-upshift regeneration.

BRIEF DESCRIPTION OF THE DRAWINGS

FIG. 11 is a flowchart showing the process procedure of a disengagement special speed change control process according to the embodiment;

DETAILED DESCRIPTION OF THE EMBODIMENT

Figure 1:
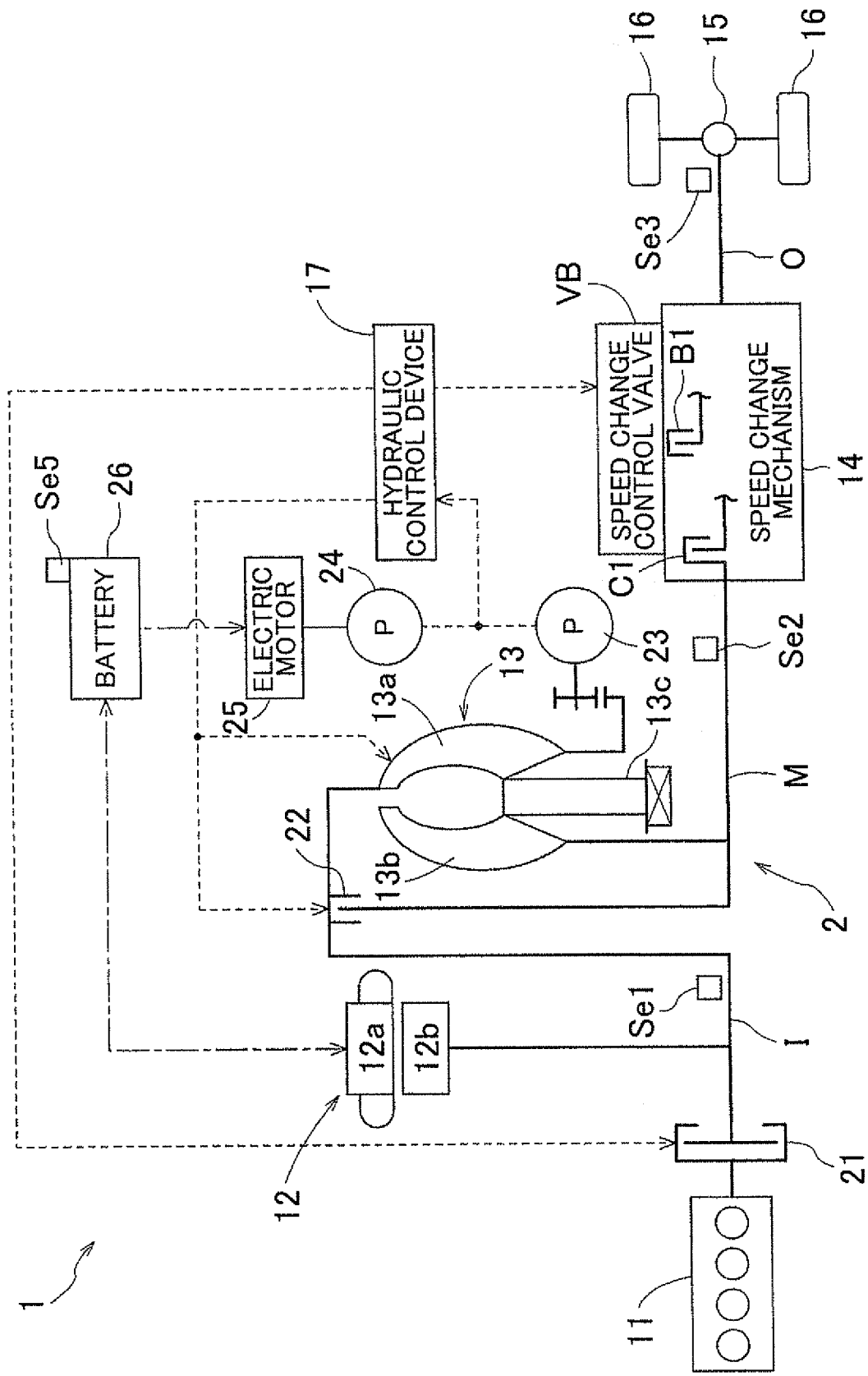
FIG. 1 is a schematic diagram showing the configuration of a vehicle drive device including a transmission device and a control unit according to an embodiment.
Figure 2:
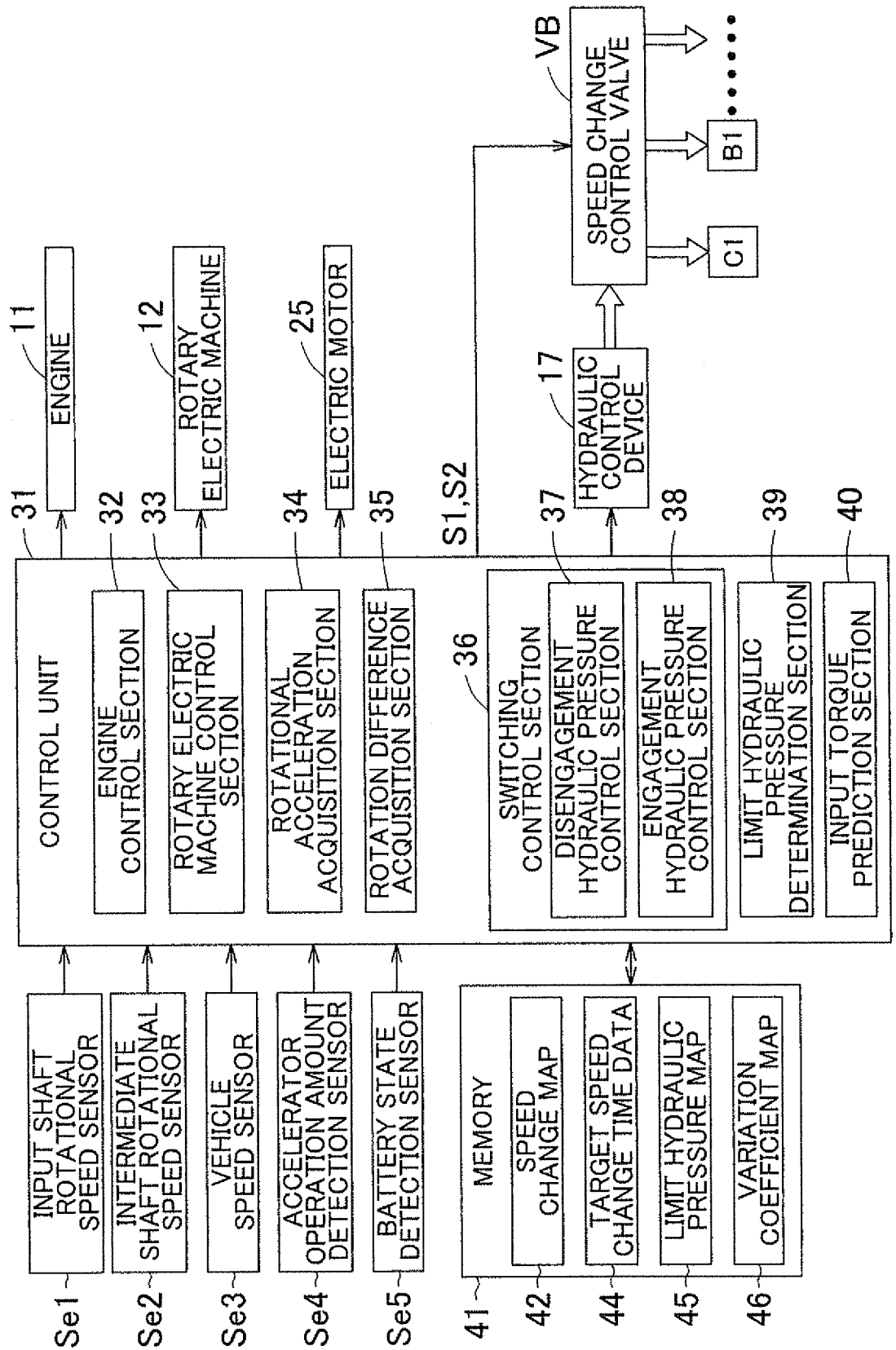
FIG. 2 is a block diagram showing the configuration of the control unit according to the embodiment.

An embodiment of the present invention will be described with reference to the drawings. In the embodiment, a control device according to the present invention is applied to a transmission device 2 forming a part of a vehicle drive device 1 for a hybrid vehicle. FIG. 1 is a schematic diagram showing the configuration of a drive transfer system and a hydraulic control system of the vehicle drive device 1 including the transmission device 2 according to the embodiment. In the drawing, the solid lines each indicate a drive force transfer path, the broken lines each indicate a hydraulic oil supply path, and the dash-dotted line indicates an electric power supply path. As shown in the drawing, the vehicle drive device 1 according to the embodiment generally includes an engine 11 and a rotary electric machine 12 each serving as a drive force source. Drive forces of the drive force sources are transferred to wheels 16 via a torque converter 13 and a speed change mechanism 14. The vehicle drive device 1 also includes a hydraulic control device 17 that supplies hydraulic oil at a predetermined hydraulic pressure to various components such as the torque converter 13 and the speed change mechanism 14. FIG. 2 is a block diagram showing the configuration of a control unit 31 according to the embodiment. In the drawing, the solid lines each indicate a signal transfer path, and the while arrows each indicate a hydraulic oil supply path. As shown in the drawing, the control unit 31 according to the embodiment is configured to control various components of the vehicle drive device 1 including the hydraulic control device 17. In the embodiment, the control unit 31 corresponds to the "control device" according to the present invention.

1. Configuration of Drive Transfer System of Vehicle Drive Device

First, the configuration of the drive transfer system of the vehicle drive device 1 according to the embodiment will be described. As shown in FIG. 1, the vehicle drive device 1 includes the engine 11 and the rotary electric machine 12 each serving as a drive force source for driving the vehicle, and serves as a drive device for a hybrid vehicle of a parallel type drivably coupled to the engine 11 and the rotary electric machine 12 in series. The vehicle drive device 1 also includes the torque converter 13 and the speed change mechanism 14, which transfer rotation of the engine 11 and the rotary electric machine 12 each serving as a drive force source to an output shaft O while changing the rotational speed and converting torque.

The engine 11 is an internal combustion engine driven by combustion of fuel. Various types of engines known in the art such as a gasoline engine and a diesel engine, for example, may be used as the engine 11. In the embodiment, an output rotary shaft of the engine 11, such as a crankshaft, is drivably coupled to an input shaft I via a transfer clutch 21. This allows the input shaft I to be selectively drivably coupled to the engine 11 via the transfer clutch 21. The transfer clutch 21 is supplied with hydraulic oil regulated by the hydraulic control device 17 to operate under control performed by a hydraulic control valve (not shown). It is also suitable that the output rotary shaft of the engine 11 is drivably coupled to the input shaft I integrally or via other members such as a damper.

The rotary electric machine 12 includes a stator 12a fixed to a case (not shown), and a rotor 12b supported on the radially inner side of the stator 12a so as to be rotatable. The rotor 12b of the rotary electric machine 12 is drivably coupled to the input shaft I so as to rotate together with the input shaft I. That is, in the embodiment, both the engine 11 and the rotary electric machine 12 are drivably coupled to the input shaft I. The rotary electric machine 12 is electrically connected to a battery 26 serving as an electricity accumulation device. The rotary electric machine 12 can function as a motor (electric motor) that is supplied with electric power to produce power and as a generator (electric generator) that is supplied with power to produce electric power. That is, the rotary electric machine 12 performs power running using electric power supplied from the battery 26, or generates electric power using a rotational drive force transferred from the engine 11 or the wheels 16 to accumulate the generated electric power in the battery 26. The battery 26 is an example of the electricity accumulation device. Other types of electricity accumulation devices such as a capacitor may be used, or a plurality of types electricity accumulation devices may be used in combination.

In the vehicle drive device 1, the rotational drive forces of both the engine 11 and the rotary electric machine 12 are transferred to the wheels 16 to drive the vehicle. In this event, the rotary electric machine 12 may produce a drive force using electric power supplied from the battery 26, or generate electric power using the rotational drive force of the engine 11, depending on the charge state of the battery 26. When the vehicle is decelerating (when a deceleration request is received), the rotary electric machine 12 generates regenerative torque to generate electric power using the rotational drive force transferred from the wheels 16. The electric power generated by the rotary electric machine 12 is accumulated in the battery 26. When the vehicle is stationary, the engine 11 and the rotary electric machine 12 are stationary with the transfer clutch 21 disengaged.

The torque converter 13 is drivably coupled to the input shaft I. The torque converter 13 is a device that transfers the rotational drive force of the input shaft I, which is drivably coupled to the engine 11 and the rotary electric machine 12 each serving as a drive force source, to the speed change mechanism 14 via an intermediate shaft M. The torque converter 13 includes a pump impeller 13a serving as an input-side rotary member and drivably coupled to the input shaft I, a turbine runner 13b serving as an output-side rotary member and drivably coupled to the intermediate shaft M, and a stator 13c provided between the pump impeller 13a and the turbine runner 13b and including a one-way clutch. The torque converter 13 transfers a drive force between the pump impeller 13a on the driving side and the turbine runner 13b on the driven side via hydraulic oil filling the torque converter 13. The intermediate shaft M is drivably coupled to both the engine 11 and the rotary electric machine 12 via the torque converter 13, the input shaft I, and the transfer clutch 21. In the embodiment, the intermediate shaft M corresponds to the "input member" according to the present invention.

The torque converter 13 includes a lock-up clutch 22 serving as a friction engagement element for lock-up. The lock-up clutch 22 is a clutch that couples the pump impeller 13a and the turbine runner 13b to rotate together with each other at a transfer efficiency enhanced by eliminating the difference in rotational speed (slipping) between the pump impeller 13a and the turbine runner 13b. Thus, when the lock-up clutch 22 is engaged, the torque converter 13 directly transfers the drive forces of the engine 11 and the rotary electric machine 12 (the input shaft I) each serving as a drive force source to the speed change mechanism 14 (the intermediate shaft M) not via hydraulic oil. In the embodiment, the lock-up clutch 22 is basically engaged so that the input shaft I and the intermediate shaft M rotate together with each other. Thus, in the embodiment, the input shaft I and the intermediate shaft M basically rotate at the same rotational speed as each other. However, in the case where normal speed change control to be discussed later is performed, such as in the case where a downshift between shift speeds is performed, for example, the lock-up clutch 22 is disengaged to transfer a drive force via the torque converter 13 in order to suppress occurrence of an impact (speed change shock) due to a speed change operation. The torque converter 13 including the lock-up clutch 22 is supplied with hydraulic oil regulated by the hydraulic control device 17.

The speed change mechanism 14 is drivably coupled to the intermediate shaft M serving as the output shaft of the torque converter 13. That is, the intermediate shaft M functions as an input shaft of the speed change mechanism 14 (a transmission input shaft). The speed change mechanism 14 is a device that transfers rotation of the intermediate shaft M to the output shaft O on the side of the wheels 16 while changing the rotational speed. In the embodiment, the intermediate shaft M, the speed change mechanism 14, and the output shaft O form the "transmission device" according to the present invention. The speed change mechanism 14 is a stepped automatic transmission (a stepped transmission) having a plurality of shift speeds. In the embodiment, the speed change mechanism 14 includes three shift speeds (a first speed, a second speed, and a third speed) with different speed ratios (speed reduction ratios) (not shown). In order to establish such shift speeds, the speed change mechanism 14 includes a gear mechanism such as a planetary gear mechanism, and a plurality of friction engagement elements. In FIG. 1, a clutch C1 and a brake B1 are schematically shown as examples of the plurality of friction engagement elements. Switching among the three shift speeds is performed by controllably engaging and disengaging the plurality of friction engagement elements.

When switching between shift speeds is performed, one of friction engagement elements that are engaged before the shifting is disengaged, and one of friction engagement elements that are disengaged before the shifting is engaged. Consequently, the respective rotational states of a plurality of rotary elements provided in the gear mechanism are switched to establish a shift speed after the shifting. The speed change mechanism 14 transfers rotation of the intermediate shaft M to the output shaft O serving as an output member while changing the rotational speed with a predetermined speed ratio set to each shift speed and converting torque. The rotational drive force transferred from the speed change mechanism 14 to the output shaft O is transferred to the wheels 16 via an output differential gear device 15. In the embodiment, the input shaft I, the intermediate shaft M, and the output shaft O are all disposed coaxially with each other to form a single-axis configuration.

2. Configuration of Hydraulic Control System

Next, the hydraulic control system of the vehicle drive device 1 discussed above will be described. As shown in FIG. 1, the hydraulic control system includes two types of pumps, namely a mechanical pump 23 and an electric pump 24, each serving as a hydraulic pressure source that sucks hydraulic oil accumulated in an oil pan (not shown) to supply the hydraulic oil to various components of the vehicle drive device 1. The mechanical pump 23 is an oil pump that operates on a rotational drive force of the input shaft I (the engine 11 and the rotary electric machine 12 each serving as a drive force source). A gear pump, a vane pump, or the like, for example, may be suitably used as the mechanical pump 23. In the embodiment, the mechanical pump 23 is drivably coupled to the input shaft I via the pump impeller 13a of the torque converter 13, and driven by a rotational drive force of one or both of the engine 11 and the rotary electric machine 12. The mechanical pump 23 basically has a discharge capacity that sufficiently exceeds the amount of hydraulic oil required for the vehicle drive device 1. However, the mechanical pump 23 does not discharge hydraulic oil while the input shaft I is stationary (for example, while the vehicle is stationary). While the input shaft I is rotating at a low speed (for example, while the vehicle is traveling at a low speed), the mechanical pump 23 does discharge hydraulic oil, but may not be able to supply an amount of oil required for the vehicle drive device 1. Thus, the vehicle drive device 1 includes the electric pump 24 serving as a pump that assists the mechanical pump 23.

The electric pump 24 is an oil pump that operates on a drive force of an electric motor 25 for driving a pump irrespective of a rotational drive force of the input shaft I (a drive force source). A gear pump, a vane pump, or the like, for example, may also be suitably used as the electric pump 24. The electric motor 25 which drives the electric pump 24 is electrically connected to the battery 26, and produces a drive force using electric power supplied from the battery 26. The electric pump 24 is a pump that assists the mechanical pump 23, and operates when a required amount of oil is not supplied from the mechanical pump 23 such as while the vehicle is stationary or traveling at a low speed.

The hydraulic control system also includes the hydraulic control device 17 which adjusts the hydraulic pressure of hydraulic oil supplied from the mechanical pump 23 and the electric pump 24 to a predetermined pressure. Although not described in detail here, the hydraulic control device 17 adjusts an opening of one or two or more adjustment valves on the basis of a signal pressure from a linear solenoid valve for hydraulic pressure adjustment to adjust the amount of hydraulic oil to be drained from the adjustment valves, thereby adjusting the hydraulic pressure of hydraulic oil to one or two or more predetermined pressures. Hydraulic oil adjusted to a predetermined pressure is supplied to the transfer clutch 21, the lock-up clutch 22, the torque converter 13, and the plurality of friction engagement elements C1, B1, . . . of the speed change mechanism 14 at a hydraulic pressure respectively required by the components.

As shown in FIG. 2, hydraulic oil is supplied from the hydraulic control device 17 to the plurality of friction engagement elements C1, B1, . . . of the speed change mechanism 14 individually via a speed change control valve VB. In this event, the speed change control valve VB adjusts an opening of the valve in accordance with control command signals S1 and S2 output from the control unit 31 to supply the friction engagement elements C1, B1, . . . with hydraulic oil adjusted to a hydraulic pressure matching the control command signals S1 and S2. Each of the friction engagement elements C1, B1, . . . includes a plurality of friction members and a piston that is moved in accordance with the hydraulic pressure of supplied hydraulic oil. When the hydraulic pressure of hydraulic oil is less than a stroke end pressure Pse, the plurality of friction members are brought closer to each other with a space between each other as the hydraulic pressure rises. When the hydraulic pressure of hydraulic oil is at the stroke end pressure Pse, the plurality of friction members contact each other while transferring no torque. When the hydraulic pressure of hydraulic oil is more than the stroke end pressure Pse, the plurality of friction members transfer torque matching the magnitude of the hydraulic pressure of hydraulic oil. The present invention is characterized in control for both engagement and disengagement of the plurality of friction engagement elements performed when the speed change mechanism 14 performs switching between shift speeds. Such control will be discussed in detail later.

3. Configuration of Control Unit

Next, the configuration of the control unit 31 according to the embodiment will be described. As shown in FIG. 2, the control unit 31 provided in the vehicle drive device 1 functions as a core member that controls operations of various components of the vehicle drive device 1. The control unit 31 includes an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth (not shown). Various functional sections 32 to 40 of the control unit 31 are formed by software (a program) stored in the ROM or the like, hardware such as a separately provided arithmetic circuit, or a combination of both. The functional sections 32 to 40 are configured to exchange information between each other. A memory 41 includes, as a hardware component, a storage medium that can store information in a rewritable manner such as a flash memory, for example, and is configured to exchange information with the control unit 31. The memory 41 may be provided in the storage device provided in the control unit 31.

As shown in FIGS. 1 and 2, the vehicle drive device I also includes a plurality of sensors provided at various locations, specifically an input shaft rotational speed sensor Se1, an intermediate shaft rotational speed sensor Se2, an output shaft rotational speed sensor Se3, an accelerator operation amount detection sensor Se4, and a battery state detection sensor Se5. The input shaft rotational speed sensor Se1 is a sensor that detects the rotational speed of the input shaft I. The intermediate shaft rotational speed sensor Se2 is a sensor that detects the rotational speed of the intermediate shaft M. The output shaft rotational speed sensor Se3 is a sensor that detects the rotational speed of the output shaft O (which is a value matching the vehicle speed). The accelerator operation amount detection sensor Se4 is a sensor that detects the amount of operation of an accelerator pedal (not shown) to detect the accelerator operation amount. The battery state detection sensor Se5 is a sensor that detects a battery state such as a charge amount and a voltage value of the battery 26. Information indicating the detection results of the sensors Se1 to Se5 is output to the control unit 31.

As shown in FIG. 2, the control unit 31 includes an engine control section 32, a rotary electric machine control section 33, a rotational acceleration acquisition section 34, a rotation difference acquisition section 35, a switching control section 36, a limit hydraulic pressure determination section 39, and an input torque prediction section 40. The switching control section 36 includes, as its subordinate functional sections, a disengagement hydraulic pressure control section 37 and an engagement hydraulic pressure control section 38. The memory 41 referenced by the functional sections 32 to 40 of the control unit 31 stores a speed change map 42, target speed change time data 44, a limit hydraulic pressure map 45, and a variation coefficient map 46. The functional sections 32 to 40 of the control unit 31 will be described in detail below.

The engine control section 32 is a functional section that controls an operation of the engine 11. The engine control section 32 determines an engine operation point, and causes the engine 11 to operate at the determined engine operation point. The engine operation point is a control command value indicating a control target point for the engine 11, and is defined by a rotational speed and torque. More particularly, the engine operation point is a command value indicating a control target point for the engine 11 determined in consideration of the vehicle required output (determined on the basis of the vehicle required torque and the engine rotational speed) and the optimum fuel efficiency, and is defined by a rotational speed command value and a torque command value. The engine control section 32 controls the engine 11 so as to operate with the torque and the rotational speed indicated by the engine operation point. In the embodiment, information on the torque command value for the engine 11 determined by the engine control section 32 is also output to the input torque prediction section 40.

The rotary electric machine control section 33 is a functional section that controls an operation of the rotary electric machine 12. The rotary electric machine control section 33 determines a rotary electric machine operation point, and causes the rotary electric machine 12 to operate at the determined rotary electric machine operation point. The rotary electric machine operation point is a control command value indicating a control target point for the rotary electric machine 12, and is defined by a rotational speed and torque. More particularly, the rotary electric machine operation point is a command value indicating a control target point for the rotary electric machine 12 determined in consideration of the vehicle required output and the engine operation point, and is defined by a rotational speed command value and a torque command value. The rotary electric machine control section 33 controls the rotary electric machine 12 so as to operate with the torque and the rotational speed indicated by the rotary electric machine operation point. The rotary electric machine control section 33 also controls switching between a state in which the rotary electric machine 12 produces a drive force using electric power supplied from the battery 26 and a state in which the rotary electric machine 12 generates electric power using a rotational drive force of the engine 11 or the like in accordance with the charge amount of the battery 26 detected by the battery state detection sensor Se5.

In the case where the torque command value is positive, the rotary electric machine 12 produces a drive force by outputting drive torque in the same direction as the rotational direction. In the case where the torque command value is negative, the rotary electric machine 12 generates electric power by outputting regenerative torque in the opposite direction to the rotational direction. In either case, the output torque (including drive torque and regenerative torque) of the rotary electric machine 12 is determined by the torque command value from the rotary electric machine control section 33. In the embodiment, information on the torque command value for the rotary electric machine 12 determined by the rotary electric machine control section 33 is also output to the limit hydraulic pressure determination section 39 and the input torque prediction section 40. Further, the rotary electric machine control section 33 is also configured to control the rotational speed of the electric motor 25 which drives the electric pump 24.

The rotational acceleration acquisition section 34 is a functional section that acquires an actual rotational acceleration AM of the intermediate shaft M. In the embodiment, the rotational acceleration acquisition section 34 sequentially receives input of information on an actual rotational speed NM of the intermediate shaft M detected by the intermediate shaft rotational speed sensor Se2 and computes the variation amount in rotational speed per unit time to acquire the rotational acceleration (rotational speed variation rate) AM. Information on the actual rotational acceleration AM of the intermediate shaft M acquired by the rotational acceleration acquisition section 34 is output to the disengagement hydraulic pressure control section 37 and the engagement hydraulic pressure control section 38 of the switching control section 36.

The rotation difference acquisition section 35 is a functional section that acquires a rotational speed difference ΔN which is the difference between a target rotational speed NT of the intermediate shaft M determined on the basis of an actual rotational speed NO of the output shaft O and the actual rotational speed NM of the intermediate shaft M. The target rotational speed NT of the intermediate shaft M is determined by multiplying the actual rotational speed NO of the output shaft O detected by the output shaft rotational speed sensor Se3 by the speed ratio of each shift speed established in the speed change mechanism 14. The actual rotational speed NM of the intermediate shaft M is detected by the intermediate shaft rotational speed sensor Se2. Here, the rotational speed difference ΔN is acquired as the absolute value of a value obtained by subtracting the actual rotational speed NM from the target rotational speed NT of the intermediate shaft M. Information on the rotational speed difference ΔN acquired by the rotation difference acquisition section 35 is output to the disengagement hydraulic pressure control section 37 and the engagement hydraulic pressure control section 38 of the switching control section 36.

Figure 3:
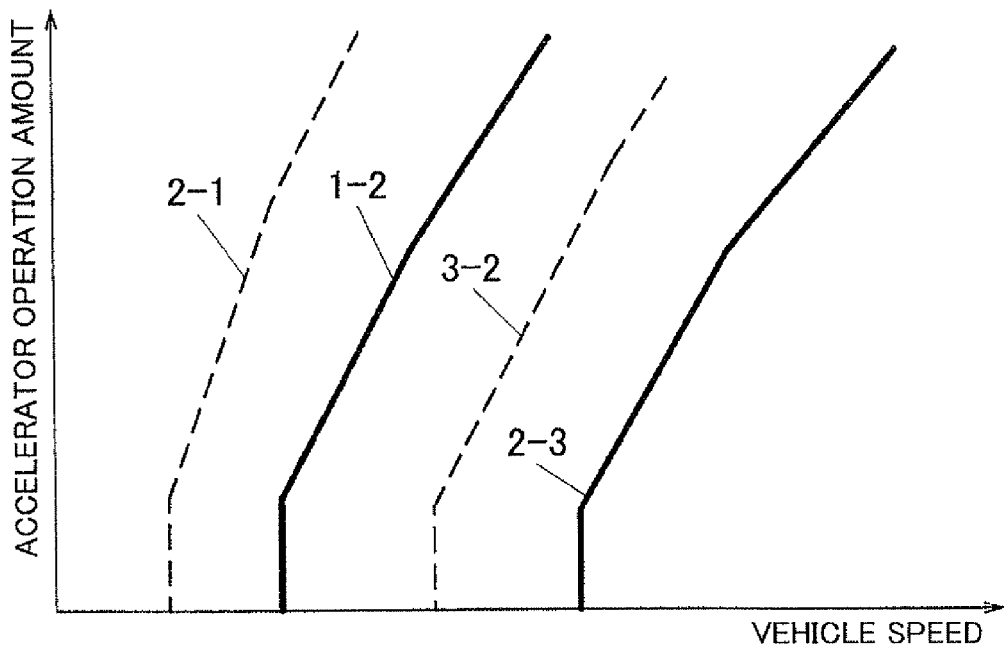
FIG. 3 shows an example of a speed change map according to the embodiment.

The switching control section 36 is a functional section that controls switching between shift speeds of the speed change mechanism 14 by determining the target shift speed for the speed change mechanism 14 on the basis of the accelerator operation amount of the vehicle and the vehicle speed and controlling an operation of the speed change control valve VB in accordance with the determined target shift speed. In order to determine the target shift speed, the switching control section 36 references the speed change map 42 stored in the memory 41. FIG. 3 shows an example of the speed change map 42 according to the embodiment. The speed change map 42 is a map in which schedules for shifting between shift speeds in the speed change mechanism 14 are set on the basis of the accelerator operation amount and the vehicle speed. As shown in the drawing, there are set a plurality of upshift lines and a plurality of downshift lines represented by straight lines generally inclined upward toward the right (with the accelerator operation amount increasing as the vehicle speed increases). An upshift line is a line defining a schedule for transitioning from a lower shift speed to a higher shift speed, of two adjacent shift speeds in the speed change mechanism 14. A downshift line is a line defining a schedule for transitioning from a higher shift speed to a lower shift speed. In the embodiment, the speed change mechanism 14 has three shift speeds, and thus there are set an upshift line for transitioning from the first speed to the second speed, an upshift line for transitioning from the second speed to the third speed, a downshift line for transitioning from the second speed to the first speed, and a downshift line for transitioning from the third speed to the second speed. Here, the term "upshift" means switching to a shift speed with a lower speed ratio, and the term "downshift" means switching to a shift speed with a higher speed ratio, with reference to the speed ratio (speed reduction ratio) of the shift speed before the shifting.

When the target shift speed for the speed change mechanism 14 is determined, a friction engagement element corresponding to the determined target shift speed is supplied with hydraulic oil to be engaged, which establishes the target shift speed. When the vehicle speed and the accelerator operation amount are varied so that an upshift line or a downshift line is crossed on the speed change map of FIG. 3, the switching control section 36 determines a new target shift speed for the speed change mechanism 14 on the basis of the accelerator operation amount of the vehicle and the vehicle speed, and a friction engagement element corresponding to the determined target shift speed is supplied with hydraulic oil to be engaged, which established the new target shift speed. In this event, one of friction engagement elements that are engaged before the shifting is disengaged, and one of friction engagement elements that are disengaged before the shifting is engaged. For example, when an upshift from the second speed to the third speed is performed in the speed change mechanism 14, the first clutch C1 is disengaged and the first brake B1 is engaged. In this case, when a downshift from the third speed to the second speed is performed in the speed change mechanism 14, the first brake B1 is disengaged and the first clutch C1 is engaged.

Engagement and disengagement of the friction engagement elements C1, B1, ... performed along with an upshift or a downshift between shift speeds are controlled by the disengagement hydraulic pressure control section 37 and the engagement hydraulic pressure control section 38. The disengagement hydraulic pressure control section 37 is a functional section that controls the hydraulic pressure of hydraulic oil (disengagement hydraulic pressure) for a friction engagement element to be disengaged (disengagement element). The disengagement hydraulic pressure control section 37 controls the disengagement hydraulic pressure by outputting the disengagement control command signal S1 serving as a control signal to the speed change control valve VB and controlling an operation of a control valve of the speed change control valve VB corresponding to the disengagement element basically in accordance with the disengagement control command signal S1. However, as discussed later, when the switching control section 36 executes special speed change control, the disengagement hydraulic pressure control section 37 controls the disengagement hydraulic pressure using the disengagement control command signal S1 only in the initial stage of a speed change process TP, and thereafter controls the disengagement hydraulic pressure on the basis of the actual rotational acceleration AM of the intermediate shaft M irrespective of the disengagement control command signal S1.

The engagement hydraulic pressure control section 38 is a functional section that controls the hydraulic pressure of hydraulic oil (engagement hydraulic pressure) for a friction engagement element to be engaged (engagement element). The engagement hydraulic pressure control section 38 controls the engagement hydraulic pressure by outputting the engagement control command signal S2 serving as a control signal to the speed change control valve VB and controlling an operation of a control valve of the speed change control valve VB corresponding to the engagement element in accordance with the engagement control command signal S2. Disengagement hydraulic pressure control performed by the disengagement hydraulic pressure control section 37 and engagement hydraulic pressure control performed by the engagement hydraulic pressure control section 38 will be discussed in detail later.

The limit hydraulic pressure determination section 39 is a functional section that determines a limit hydraulic pressure serving as a reference for determining one or both of a lower limit set value and an upper limit set value of the hydraulic pressure of hydraulic oil (disengagement hydraulic pressure) for a friction engagement element to be disengaged (disengagement element). In the embodiment, the limit hydraulic pressure determination section 39 sets two limit hydraulic pressures determined independently of each other, namely a first limit hydraulic pressure PL1 determined in accordance with the output torque of the rotary electric machine 12 and a second limit hydraulic pressure PL2 determined in accordance with the accelerator operation amount detected by the accelerator operation amount detection sensor Se4, as limit hydraulic pressures each serving as a reference for determining the lower limit set value of the disengagement hydraulic pressure. Meanwhile, the limit hydraulic pressure determination section 39 sets a predetermined third limit hydraulic pressure PL3 as a limit hydraulic pressure serving as a reference for determining the upper limit set value of the disengagement hydraulic pressure.

Figure 4:
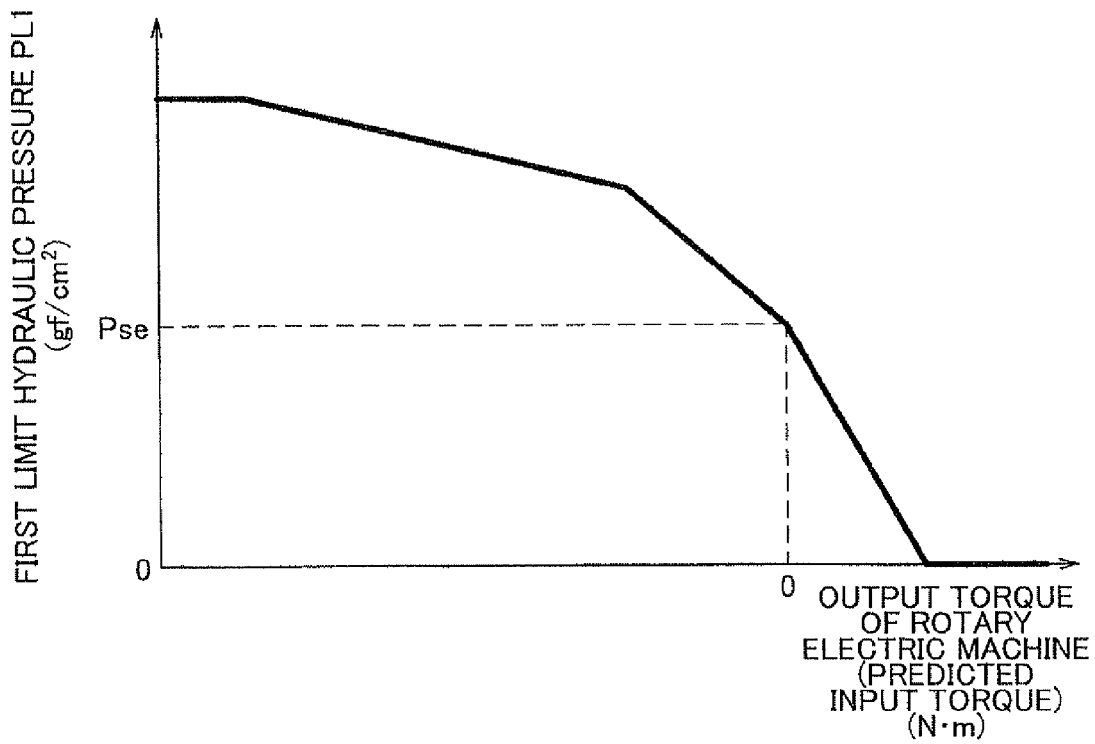
FIG. 4 shows an example of a first limit hydraulic pressure map according to the embodiment.

The first limit hydraulic pressure PL1 is set to a value that matches the magnitude of the output torque of the rotary electric machine 12 (which is determined in accordance with the torque command value from the rotary electric machine control section 33 in the embodiment), and that is equal to or more than the stroke end pressure Pse for the disengagement element in the case where the output torque of the rotary electric machine 12 is negative. The stroke end pressure Pse for the disengagement element is a disengagement hydraulic pressure at which the disengagement element is immediately before starting to have a torque capacity with the piston moved such that no clearance is provided between the friction members of the disengagement element. In the case where the output torque of the rotary electric machine 12 is negative, the first limit hydraulic pressure PL1 is at least equal to or more than the stroke end pressure Pse, and thus the engagement pressure for the disengagement element is made at least more than zero so that the disengagement element can have a torque capacity. In the case where the output torque of the rotary electric machine 12 is positive, the first limit hydraulic pressure PL1 may be less than the stroke end pressure Pse for the disengagement element. FIG. 4 shows an example of a first limit hydraulic pressure map defining the relationship between the output torque of the rotary electric machine 12 and the first limit hydraulic pressure PL1. In the embodiment, as shown in FIG. 4, the first limit hydraulic pressure PL1 is set to be equal to the stroke end pressure Pse for the disengagement element in the case where the output torque of the rotary electric machine 12 is zero, and to become higher as the output torque of the rotary electric machine 12 becomes higher in the negative direction (as the regenerative torque becomes higher). The first limit hydraulic pressure map is formed as a part of the limit hydraulic pressure map 45 stored in the memory 41. In the embodiment, with the first limit hydraulic pressure PL1 set as described above, in the case where the rotary electric machine 12 outputs negative torque (regenerative torque) to generate electric power, the disengagement hydraulic pressure is maintained at a hydraulic pressure that is equal to or more than the stroke end pressure Pse and that becomes higher as the absolute value of the negative torque becomes larger over the entire speed change process TP. The first limit hydraulic pressure map shown in FIG. 4 is merely exemplary, and may be modified appropriately in accordance with vehicle characteristics or the like.

Figure 5:
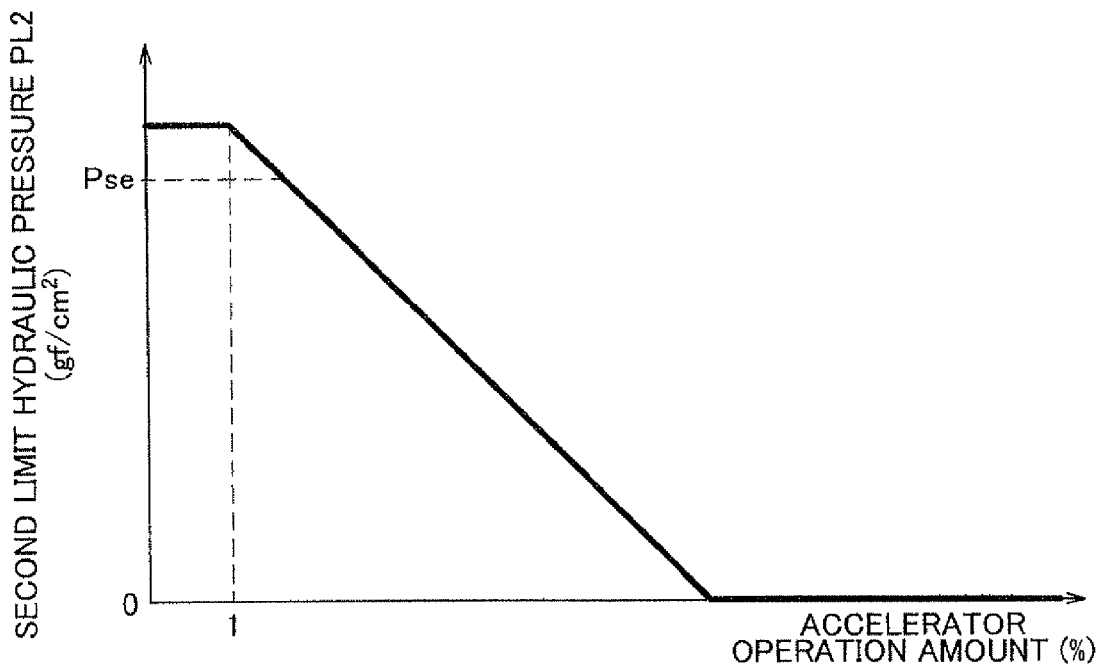
FIG. 5 shows an example of a second limit hydraulic pressure map according to the embodiment.

The second limit hydraulic pressure PL2 is set to a value that matches the accelerator operation amount, and that is equal to or more than the stroke end pressure Pse for the disengagement element in a small acceleration operation amount state in which the accelerator operation amount is equal to or less than a predetermined value. The predetermined value may be set to "1 to 5%". In the embodiment, the predetermined value is set to "1%", and a state in which the accelerator operation amount detected by the accelerator operation amount detection sensor Se4 is substantially equal to zero, or in which the amount of depression of the accelerator pedal is generally completely zero, is defined as a "small acceleration operation amount state". In the small acceleration operation amount state, the second limit hydraulic pressure PL2 is at least equal to or more than the stroke end pressure Pse, and thus the engagement pressure for the disengagement element is made at least more than zero so that the disengagement element can have a torque capacity. When the accelerator operation amount is larger than the predetermined value, the second limit hydraulic pressure PL2 may be less than the stroke end pressure Pse for the disengagement element. In the embodiment, the second limit hydraulic pressure PL2 is set to become smaller as the accelerator operation amount becomes larger when the accelerator operation amount is larger than 1%. FIG. 5 shows an example of a second limit hydraulic pressure map defining the relationship between the accelerator operation amount and the second limit hydraulic pressure PL2. The second limit hydraulic pressure map is formed as a part of the limit hydraulic pressure map 45 stored in the memory 41. With the second limit hydraulic pressure PL2 set as described above, in the small acceleration operation amount state, the disengagement hydraulic pressure is maintained at a hydraulic pressure that is equal to or more than the stroke end pressure Pse over the entire speed change process TP. The second limit hydraulic pressure map shown in FIG. 5 is merely exemplary, and may be modified appropriately in accordance with vehicle characteristics or the like.

The third limit hydraulic pressure PL3 is set to a predetermined value. In the embodiment, the third limit hydraulic pressure PL3 is set in consideration of a tie-up rate, which is the possibility that the engagement element and the disengagement element are engaged at the same time. When the tie-up rate is high, shift feeling in the speed change process TP may be deteriorated. Therefore, in the embodiment, the third limit hydraulic pressure PL3 is set to maintain the tie-up rate at a predetermined value or less. That is, the third limit hydraulic pressure PL3 is an upper limit set value of the disengagement hydraulic pressure that maintains the tie-up rate at a predetermined value or less over the entire speed change process TP, and functions as a disengagement upper limit hydraulic pressure (see FIG. 18).

The first limit hydraulic pressure PL1, the second limit hydraulic pressure PL2, and the third limit hydraulic pressure PL3 determined by the limit hydraulic pressure determination section 39 are output to the disengagement hydraulic pressure control section 37. Then, in the embodiment, as discussed later, the disengagement hydraulic pressure control section 37 controls the disengagement hydraulic pressure over the entire speed change process TP such that the disengagement hydraulic pressure is restricted using the first limit hydraulic pressure PL1 or the second limit hydraulic pressure PL2, whichever is the higher at each time point in the speed change process TP, as the lower limit value and using the third limit hydraulic pressure PL3 as the upper limit value. Thus, in the speed change process TP, the disengagement hydraulic pressure is controlled to be equal to or more than the higher one of the first limit hydraulic pressure PL1 and the second limit hydraulic pressure PL2 and to be equal to or less than the third limit hydraulic pressure PL3 over the entire speed change process TP.

The input torque prediction section 40 is a functional section that predicts predicted input torque PTi on the basis of variations in input torque Ti input to the intermediate shaft M serving as the input member. The predicted input torque PTi is a predicted value of the input torque Ti a predetermined prediction determination reference time (here, defined as TSp) later. In the embodiment, as described above, the engine 11 and the rotary electric machine 12 each serving as a drive force source for the vehicle are drivably coupled to the input shaft I. In the embodiment, as discussed above, the lock-up clutch 22 is basically engaged so that the input shaft I and the intermediate shaft M rotate together with each other. That is, in the embodiment, torque input to the input shaft I is basically input as it is to the intermediate shaft M. Hence, in the embodiment, the total of the output torque of the engine 11 and the output torque of the rotary electric machine 12 is used as the input torque Ti. In the embodiment, the output torque of the engine 11 can be acquired as the torque command value for the engine 11 determined by the engine control section 32, and similarly the output torque of the rotary electric machine 12 can be acquired as the torque command value for the rotary electric machine 12 determined by the rotary electric machine control section 33. As described above, the torque command value for the rotary electric machine 12 may be either positive or negative depending on whether the output torque of the rotary electric machine 12 is drive torque (power-running torque) or regenerative torque. In either case, the total of the torque command value for the engine 11 and the torque command value for the rotary electric machine 12 is used as the input torque Ti. The prediction determination reference time TSp may be set to a desired value in advance, and may be set to 0.1 to 1 [sec], for example.

In the embodiment, the input torque prediction section 40 acquires an input torque variation rate RTi at predetermined intervals. The input torque variation rate RTi is the variation rate of the input torque Ti over time. The current (at the time point in the n-th cycle; the same applies hereinafter) input torque variation rate RTi(n) is derived by dividing an input torque variation amount ΔTi, which is the difference between the current input torque Ti(n) and the input torque Ti(n−1) at the time point one cycle earlier, by an interval A.

$$RTi(n) = \Delta Ti/A \qquad \text{(Formula 1)}$$
$$= \{Ti(n) - Ti(n-1)\}/A$$

The derived input torque variation rate RTi is used to derive a predicted torque variation rate QTi.

In the embodiment, the input torque prediction section 40 computes the predicted torque variation rate QTi at predetermined intervals. When deriving the predicted torque variation rate QTi, the input torque prediction section 40 adds the latest input torque variation rate RTi and the preceding predicted torque variation rate QTi at predetermined ratios to derive the latest predicted torque variation rate QTi. That is, the currently latest predicted torque variation rate QTi(n) is derived by smoothing the input torque variation rate RTi(n) by adding the currently latest input torque variation rate RTi(n) derived by (Formula 1) above and the predicted torque variation rate QTi(n−1) at the time point one cycle earlier at predetermined ratios.

$$QTi(n) = k*RTi(n) + (1-k)*QTi(n-1) \qquad \text{(Formula 2)}$$

In this way, the input torque prediction section 40 updates the currently latest predicted torque variation rate QTi at predetermined intervals. The symbol "*" is used to represent a multiplication (the same applies hereinafter).

Here, k is a predetermined weighting coefficient ($0<k\leq1$). In the case where the weighting coefficient k is set to a value that is less than 1, the input torque variation rates RTi derived in respective computation cycles are sequentially accumulated to be reflected in subsequent derivation of the predicted torque variation rates QTi. As can be well understood from (Formula 2) above, as the weighting coefficient k is smaller (closer to 0), the accumulation of the previous input torque variation rates RTi is given a higher weight in deriving the current predicted torque variation rate QTi. Meanwhile, as the weighting coefficient k is larger (closer to 1), the currently latest input torque variation rate RTi is given a higher weight in deriving the current predicted torque variation rate QTi. In the case where the weighting coefficient k is set to "1", the current input torque variation rate RTi is used as it is as the current predicted torque variation rate QTi. In the embodiment, the weighting coefficient k is set to 0.1 to 0.5 (preferably 0.1 to 0.3), for example. With the weighting coefficient k set as described above, it is possible to adequately derive the latest predicted torque variation rate QTi while grasping the overall tendency of variations in input torque Ti over time.

The input torque prediction section 40 derives the predicted input torque on the basis of the current input torque Ti and the latest predicted torque variation rate QTi. More specifically, the input torque prediction section 40 derives the predicted input torque PTi by adding a value obtained by multiplying the predicted torque variation rate QTi by the prediction determination reference time TSp and the current input torque Ti. That is, the current predicted input torque PTi(n) is derived by adding the product of the current predicted torque variation rate QTi(n) and the prediction determination reference time TSp set in advance and the current input torque Ti(n).

$$PTi(n)=Ti(n)QTi(n)*TSp \quad \text{(Formula 3)}$$

In this way, the predicted input torque PTi, which is a predicted value of the input torque Ti the prediction determination reference time TSp after the current time point, is derived on the basis of variations in input torque Ti input to the input shaft I. In the embodiment, in the case where the predicted input torque PTi derived by (Formula 3) is more than the input torque Ti, the input torque prediction section 40 uses the input torque Ti as the predicted input torque PTi. That is, the input torque prediction section 40 according to the embodiment is configured to derive the predicted input torque PTi which is different from the input torque Ti only in the case where the predicted value of the input torque Ti the prediction determination reference time TSp later is less than the current input torque Ti. Information on the predicted input torque PTi derived by the input torque prediction section 40 is output to the switching control section 36.

4. Details of Speed Change Control

Next, the speed change control, that is, control of hydraulic pressures to be supplied to the engagement element and the disengagement element, according to the embodiment will be described in detail. The speed change control according to the embodiment is characterized in that in the case where the state of the vehicle satisfies predetermined special speed change control transition conditions, the disengagement hydraulic pressure for the disengagement element is lowered to cause the disengagement element to slip and the disengagement element is maintained in the slipping state over the entire speed change process TP. The speed change control according to the embodiment is also characterized in that the engagement hydraulic pressure for the engagement element is varied so as to appropriately vary the actual rotational speed of the intermediate shaft M in maintaining the disengagement element in the slipping state over the entire speed change process TP. The speed change control according to the embodiment will be described in detail below.

The switching control section 36 performs the speed change control by switching between normal speed change control and special speed change control in accordance with whether or not the state of the vehicle satisfies the predetermined special speed change control transition conditions. That is, the switching control section 36 basically executes the normal speed change control, and executes the special, speed change control in the case where the state of the vehicle satisfies the predetermined special speed change control transition conditions. In the embodiment, the special speed change control transition conditions are conditions on the accelerator operation amount, the predicted input torque PTi, and the direction of switching between shift speeds to be performed in the speed change mechanism 14. Specifically, the special speed change control transition conditions are satisfied when the target shift speed for the speed change mechanism 14 is switched (upshifted) from a shift speed with a higher speed ratio to a shift speed with a lower speed ratio in the small acceleration operation amount state, in which the accelerator operation amount detected by the accelerator operation amount detection sensor Se4 is equal to or less than a predetermined value (for example, 1 to 5%), or in a negative torque prediction established state, in which the predicted input torque PTi derived by the input torque prediction section 40 is negative.

4-1. Normal Speed Change Control

Figure 14:
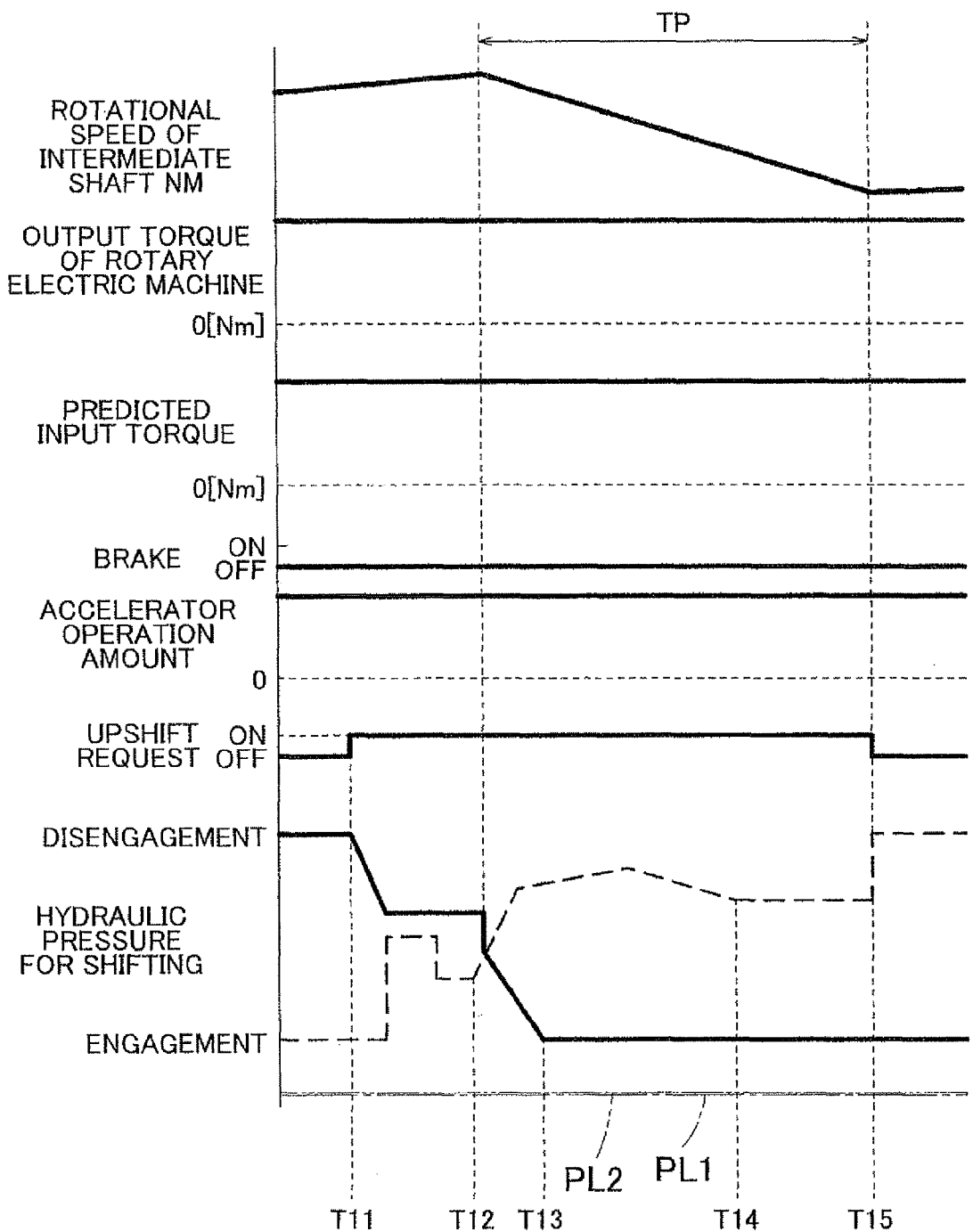
FIG. 14 is a timing chart illustrating an example of a normal speed change control process according to the embodiment.

In the case where the special speed change control transition conditions are not satisfied, that is, in the case where the accelerator operation amount is larger than a predetermined value and the predicted input torque PTi is zero or a positive value, or in the case where the target shift speed for the speed change mechanism 14 is switched (downshifted) from a shift speed with a lower speed ratio to a shift speed with a higher speed ratio, the normal speed change control is executed. In the normal speed change control, as shown in FIG. 14, the disengagement element is disengaged quickly in the initial stage of the speed change process TP, and the engagement element is completely engaged through a slipping state. That is, when the speed change process TP is started, the disengagement hydraulic pressure control section 37 abruptly lowers the disengagement hydraulic pressure to quickly disengage the disengagement element. Meanwhile, the engagement hydraulic pressure control section 38 preliminarily charges hydraulic oil into an oil chamber of the engagement element, and then varies the engagement hydraulic pressure so as to vary the rotational speed of the intermediate shaft M at a predetermined target rotational acceleration AT. The target rotational acceleration of the intermediate shaft M is determined on the basis of the target speed change time within which switching between shift speeds is to be performed and the rotational speed variation range of the intermediate shaft M before and after switching between shift speeds.

4-2. Special Speed Change Control

In the case where the special speed change control transition conditions are satisfied, on the other hand, the special speed change control characteristic to the present invention is executed. In the following, a case where the special speed change control transition conditions are satisfied by upshifting the target shift speed for the speed change mechanism 14 in the small acceleration operation amount state will first be described. In the special speed change control, both disengagement special speed change control, in which the disengagement hydraulic pressure for the disengagement element is controlled, and engagement special speed change control, in which the engagement hydraulic pressure for the engagement element is controlled, are executed. In the disengagement special speed change control, the disengagement element is maintained in the slipping state over the entire speed change process TP. In the embodiment, the disengagement special speed change control is executed through control steps including standby control, variation rate control, rotational speed control, and disengagement control. In the standby control, the variation rate control, the rotational speed control, and the disengagement control, the disengagement hydraulic pressure is controlled by the disengagement hydraulic pressure control section 37. In the engagement special speed change control, the engagement hydraulic pressure is varied so as to appropriately vary the actual rotational speed of the intermediate shaft M over the entire speed change process TP. In the embodiment, the engagement special speed change control is executed through control steps including first engagement control and second engagement control. In the first engagement control and the second engagement control, the engagement hydraulic pressure is controlled by the engagement hydraulic pressure control section 38.

Figure 7:
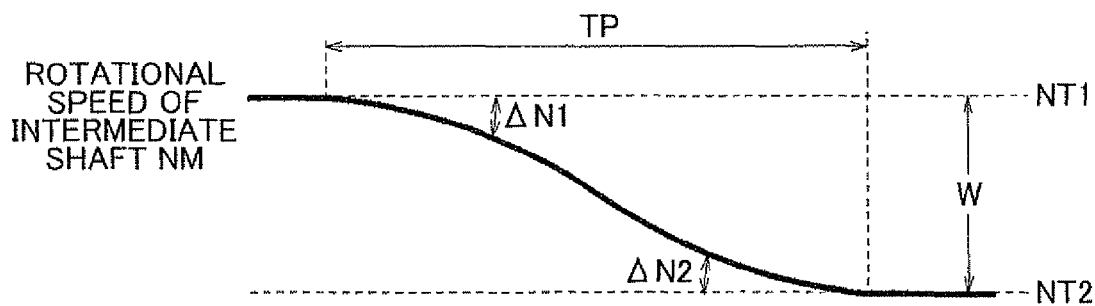
FIG. 7 illustrates a speed change process according to the embodiment.

The speed change process TP (see FIG. 7 and so forth) is a process in which the rotational speed NM of the intermediate shaft M serving as the input shaft of the transmission device 2 transitions from a pre-switching target rotational speed NT1, which is the target rotational speed NT before switching between shift speeds, to a post-switching target rotational speed NT2, which is the target rotational speed NT after switching between shift speeds. In the embodiment, the speed change process TP is set to a period from a time point when a rotational speed difference ΔN1 before switching between shift speeds, which is acquired by the rotation difference acquisition section 35, becomes equal to or more than a predetermined value to a time point when a rotational speed difference ΔN2 after switching between shift speeds, which is acquired by the rotation difference acquisition section 35, becomes equal to or less than a predetermined value. In this case, the predetermined value is set to a value that makes it possible to recognize the occurrence of a deviation between the actual rotational speed NM of the intermediate shaft M and the target rotational speed NT1 or NT2 before or after switching between shift speeds. Thus, in the embodiment, the speed change process TP is a period from a time point when the disengagement element starts slipping to a time point when the rotational speed difference ΔN2 between a rotational speed obtained by multiplying the rotational speed of the output shaft O by the speed ratio after switching between shift speeds and the rotational speed NM of the intermediate shaft M becomes equal to or less than a predetermined value to achieve synchronization. The speed change process TP is also a period from a time point when the disengagement element starts slipping to a time point when engagement members (input-side rotary member and output-side rotary member) on both sides of the engagement element are synchronized with each other. In this case, in the case where the engagement element is formed by a brake, one of the input-side rotary member and the output-side rotary member is a non-rotary member (such as a case (not shown), for example), and thus the speed change process TP is terminated at a time point when the rotational speed of the other rotary member becomes generally zero.

4-2-1. Disengagement Special Speed Change Control

In the disengagement special speed change control, first, the standby control is executed before the speed change process TP is entered. In the standby control, when an upshift of the target shift speed is requested on the basis of the accelerator operation amount of the vehicle and the vehicle speed, the disengagement hydraulic pressure control section 37 keeps the disengagement hydraulic pressure at a pressure matching the output torque until a certain time elapses. The standby time is monitored by an internal timer.

When a certain time elapses after an upshift is requested, then the variation rate control is executed. In the variation rate control, which is executed in the initial stage of the speed change process TP, the disengagement hydraulic pressure control section 37 lowers the disengagement hydraulic pressure at a variation rate matching the magnitude of the output torque of the rotary electric machine 12. In the embodiment, further, in the case where the rotary electric machine 12 is outputting negative torque (regenerative torque), the absolute value of the variation rate at which the disengagement hydraulic pressure is lowered is reduced as the output torque becomes lower (as the regenerative torque becomes higher), and the absolute value of the variation rate at which the disengagement hydraulic pressure is lowered is increased as the output torque becomes higher (as the regenerative torque becomes lower). At this time, the absolute value of the variation rate at which the disengagement hydraulic pressure is lowered is set to a value that is sufficiently smaller than the absolute value of the variation rate in the normal speed change control discussed above so that the disengagement hydraulic pressure is lowered more gently. In this course, the disengagement element is maintained in the half engaged state in which the disengagement element is not completely engaged or disengaged. This allows transfer of a drive force between engagement members (input-side rotary member and output-side rotary member) on both sides of the disengagement element with the input-side rotary member and the output-side rotary member of the disengagement element maintained in the slipping state with a predetermined rotational speed difference.

During the variation rate control, the disengagement hydraulic pressure control section 37 controls the disengagement hydraulic pressure such that the engagement pressure for the disengagement element becomes equal to or more than a predetermined value. In the embodiment, in order that the engagement pressure for the engagement element becomes equal to or more than a predetermined value, a lower limit value is set for the disengagement hydraulic pressure during the variation rate control. Specifically, the higher one of the two limit hydraulic pressures (the first limit hydraulic pressure PL1 and the second limit hydraulic pressure PL2) determined by the limit hydraulic pressure determination section 39 is set as the lower limit value of the disengagement hydraulic pressure. Consequently, the disengagement hydraulic pressure during the variation rate control is maintained at a pressure that is equal to or more than the first limit hydraulic pressure PL1 and that is equal to or more than the second limit hydraulic pressure PL2. In the embodiment, as described above, the second limit hydraulic pressure PL2 is set to a value that is equal to or more than the stroke end pressure Pse for the disengagement element in the small acceleration operation amount state in which the special speed change control is executed. Thus, in the embodiment, during execution of the special speed change control, the disengagement element is brought to the half engaged state to be maintained in the slipping state. Also in the embodiment, as described above, the first limit hydraulic pressure PL1 is set to become higher as the output torque of the rotary electric machine 12 becomes higher in the negative direction (as the regenerative torque becomes higher). Thus, in the embodiment, the disengagement hydraulic pressure during the special speed change control is basically maintained at the second limit hydraulic pressure PL2 or more, and maintained at the first limit hydraulic pressure PL1 or more in the case where the first limit hydraulic pressure PL1 becomes higher than the second limit hydraulic pressure PL2 in accordance with the magnitude of the regenerative torque (negative torque) output by the rotary electric machine 12. In the embodiment, further, in order that the engagement pressure for the engagement element becomes equal to or less than a predetermined value, an upper limit value is set for the disengagement hydraulic pressure in the speed change process TP. Specifically, the predetermined third limit hydraulic pressure PL3 is set as the upper limit value of the disengagement hydraulic pressure. Consequently, the disengagement hydraulic pressure in the speed change process TP is maintained at a pressure that is equal to or less than the third limit hydraulic pressure PL3.

The switching control section 36 monitors a degree of progress a of a speed change operation in the speed change process TP over the entire speed change process TP. The degree of progress α serves as an index representing how much switching between shift speeds has progressed in the speed change process TP. In the embodiment, the degree of progress α is derived as the proportion of the difference between the pre-switching target rotational speed NT1 of the intermediate shaft M and the actual rotational speed NM of the intermediate shaft M during the speed change operation to the difference (a rotational speed variation range W) between the pre-switching target rotational speed NT1 of the intermediate shaft M and the post-switching target rotational speed NT2 of the intermediate shaft M. As described above, the target rotational speeds NT1 and NT2 of the intermediate shaft M before and after switching between shift speeds are derived by multiplying the actual rotational speed NO of the output shaft O detected by the output shaft rotational speed sensor Se3 by the speed ratio of each shift speed established in the speed change mechanism 14. The actual rotational speed NM of the intermediate shaft M is detected by the intermediate shaft rotational speed sensor Se2. Thus, the degree of progress a is derived on the basis of the actual rotational speed NM of the intermediate shaft M detected by the intermediate shaft rotational speed sensor Se2, the actual rotational speed NO of the output shaft O detected by the output shaft rotational speed sensor Se3, and the speed ratio of each shift speed before and after switching.

The variation rate control is executed until a switching point which is a time point when the degree of progress α reaches a predetermined proportion as long as the special speed change control transition conditions are satisfied. In the embodiment, the variation rate control is executed until a switching point which is a time point when the speed change operation has progressed to 50% (the degree of progress α has reached 0.5) on condition that the special speed change control transition conditions are satisfied. Whether or not the special speed change control transition conditions are satisfied is determined on the basis of the accelerator operation amount detected by the accelerator operation amount detection sensor Se4 and the direction of switching of the target shift speed for the speed change mechanism 14. That is, in the small acceleration operation amount state in which the accelerator operation amount is equal to or less than a predetermined value and in the case where the target shift speed for the speed change mechanism 14 is switched (upshifted) from a shift speed with a speed ratio to a higher shift speed with a lower speed ratio, it is determined that the special speed change control transition conditions are satisfied. Otherwise, it is determined that the special speed change control transition conditions are not satisfied.

When the speed change operation progresses by 50% to reach the switching point (the degree of progress α becomes 0.5) with the special speed change control transition conditions satisfied, then the rotational speed control is executed. In the rotational speed control, the disengagement hydraulic pressure control section 37 varies the disengagement hydraulic pressure such that the rotational speed NM of the intermediate shaft M becomes the target rotational speed NT at each time point in the speed change process TP. In the embodiment, a target speed change time (here, defined as Tt) representing the target time within which switching between shift speeds is to be performed is set in advance, and it is assumed that a speed change operation is completed when the target speed change time Tt elapses after the start of the speed change operation. The target speed change time Tt is stored in the memory 41 as the target speed change time data 44. Then, the target rotational speed NT of the intermediate shaft M at each time point is determined on the basis of the target speed change time Tt and the rotational speed variation range W which is the difference between the rotational speeds of the intermediate shaft M before and after switching between shift speeds. At this time, the target rotational speed NT at each time point in the speed change process TP is set to draw a track over time that causes almost no variations in behavior of the vehicle when switching between shift speeds is performed. More specifically, the target rotational speed NT at each time point in the speed change process TP is set to draw a track over time that reduces the absolute value of the variation rate of the target rotational speed NT over time toward the termination of the speed change process TP. In the embodiment, the target rotational speed NT at each time point is set such that the rotational speed of the intermediate shaft M draws a track over time represented by a quadratic curve from a time point when the rotational speed control is started to a time point when the speed change operation is completed.

Figure 8:
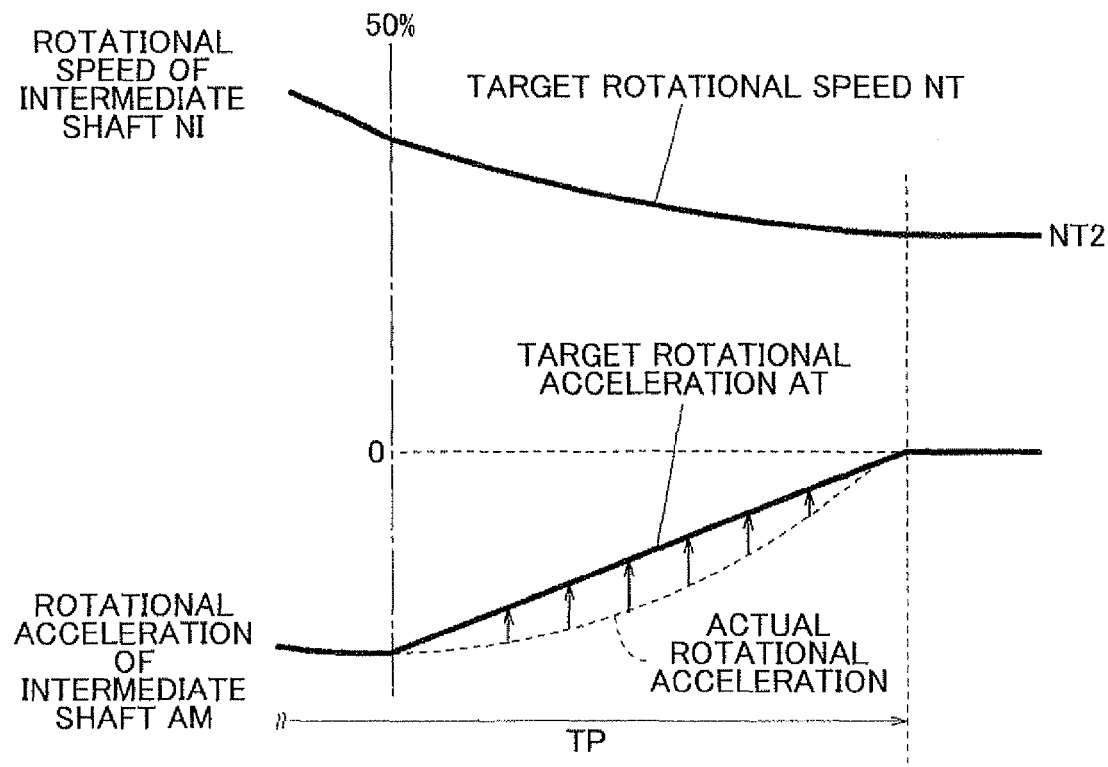
FIG. 8 illustrates a control method for a disengagement hydraulic pressure in rotational speed control.

In the embodiment, further, the target rotational acceleration AT (a target rotational speed variation rate) at each time point is derived from the target rotational speed NT at each time point set as described above. In the embodiment, the target rotational speed NT at each time point is set to draw a track over time represented by a quadratic curve, and thus the target rotational acceleration AT at each time point is set such that the absolute value of the target rotational acceleration AT becomes gradually smaller linearly toward the termination of the speed change operation to finally become zero. The target rotational acceleration AT at each time point may be set also in consideration of the acceleration of the vehicle. Then, the disengagement hydraulic pressure control section 37 varies the disengagement hydraulic pressure such that the actual rotational acceleration AM of the intermediate shaft M acquired by the rotational acceleration acquisition section 34 follows the target rotational acceleration AT at each time point. That is, as shown in FIG. 8, the disengagement hydraulic pressure control section 37 compares the target rotational acceleration AT and the actual rotational acceleration AM of the intermediate shaft M at each time, and in the case where there is a deviation between the accelerations AT and AM, varies the disengagement hydraulic pressure so as to vary the actual rotational acceleration AM of the intermediate shaft M in the direction of eliminating the deviation. In this way, the rotational speed NM of the intermediate shaft M can be smoothly brought to the post-switching target rotational speed NT2 in the latter stage of the speed change process TP. In this course, the disengagement element is maintained in the half engaged state in which the disengagement element is not completely engaged or disengaged as described above, and maintained in the slipping state.

The rotational speed control is executed until the rotational speed difference ΔN2 between the post-switching target rotational speed NT2 and the actual rotational speed NM of the intermediate shaft M acquired by the rotation difference acquisition section 35 becomes equal to or less than a predetermined value as long as the special speed change control transition conditions are satisfied. In the embodiment, the predetermined value is set to a value that is equal to the reference value for determining the termination of the speed change process TP. Thus, in the embodiment, the rotational speed control and the speed change process TP are terminated at the same timing.

In the case where the special speed change control transition conditions are not satisfied any more during execution of the variation rate control or the rotational speed control, or in the case where the rotational speed difference ΔN2 after switching between shift speeds acquired by the rotation difference acquisition section 35 becomes equal to or less than a predetermined value, then the disengagement control is executed. In the disengagement control, the disengagement hydraulic pressure control section 37 lowers the disengagement hydraulic pressure at a variation rate that is equal to the variation rate of the disengagement hydraulic pressure in the normal speed change control to rapidly become zero. Consequently, the disengagement element is quickly completely disengaged.

4-2-2. Engagement Special Speed Change Control

In the engagement special speed change control, first, the engagement hydraulic pressure control section 38 determines a reference hydraulic pressure variation amount $\Delta Pb$ serving as a reference for varying the engagement hydraulic pressure before the speed change process TP is entered. The reference hydraulic pressure variation amount $\Delta Pb$ is a hydraulic pressure variation amount required to vary the rotational speed of the intermediate shaft M at the predetermined target rotational acceleration AT. The reference hydraulic pressure variation amount $\Delta Pb$ is derived as the product of the target rotational acceleration AT and a predetermined coefficient. As described above, the target rotational acceleration AT of the intermediate shaft M is determined on the basis of the target speed change time (here, defined as Tt), which is set in advance and which represents the target time within which switching between shift speeds is to be performed, and the rotational speed variation range W, which represents the difference between the rotational speeds of the intermediate shaft M before and after switching between shift speeds. That is, the target rotational acceleration AT of the intermediate shaft M is derived as the quotient of the rotational speed variation range W divided by the target speed change time Tt. Hence, the reference hydraulic pressure variation amount $\Delta Pb$ is also determined on the basis of the target speed change time Tt and the rotational speed variation range W.

Figure 6:
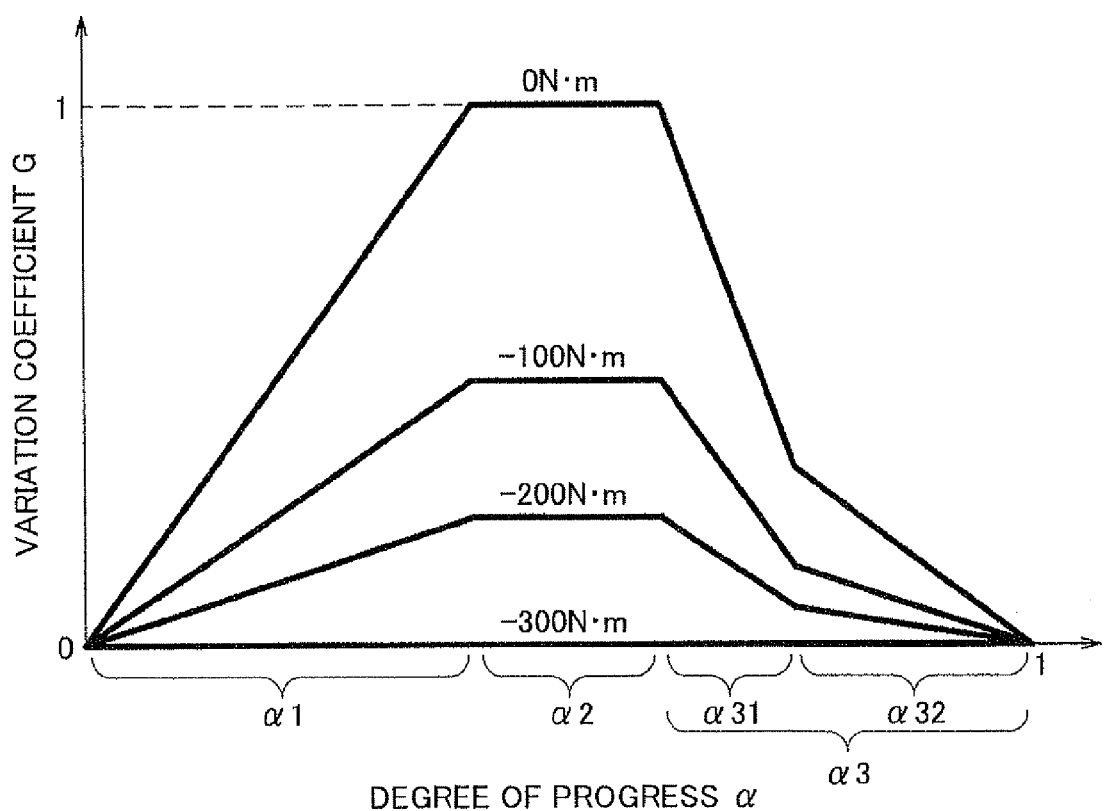
FIG. 6 shows an example of a variation coefficient map according to the embodiment.

The engagement hydraulic pressure control section 38 executes the first engagement control in which the hydraulic pressure (engagement hydraulic pressure) of hydraulic oil for the engagement element is varied such that the actual rotational acceleration AM of the intermediate shaft M follows the target rotational acceleration AT on the basis of the derived target rotational acceleration AT. In the embodiment, in order to execute the first engagement control, the engagement hydraulic pressure control section 38 is configured to vary the engagement hydraulic pressure on the basis of a predetermined variation coefficient G which is set in advance in accordance with the degree of progress $\alpha$ of the speed change process TP and the output torque of the rotary electric machine 12, and the reference hydraulic pressure variation amount $\Delta Pb$ with reference to the engagement hydraulic pressure at the start of the speed change process TP. FIG. 6 shows an example of the variation coefficient map 46 defining the relationship among the degree of progress $\alpha$ of the speed change process TP, the output torque of the rotary electric machine 12, and the variation coefficient G. In the map of FIG. 6, the horizontal axis and the vertical axis represent the degree of progress $\alpha$ and the variation coefficient G, respectively, and a plurality of line graphs representing the relationship between the degree of progress $\alpha$ and the variation coefficient G for each of a plurality of (four) representative values of the output torque of the rotary electric machine 12 are shown. The speed change process TP is divided into a plurality of stages (in the embodiment, three stages, namely a first stage $\alpha 1$, a second stage $\alpha 2$, and a third stage $\alpha 3$) set in accordance with the degree of progress $\alpha$.

As shown in FIG. 6, under conditions that the output torque of the rotary electric machine 12 is kept at a constant value over the entire speed change process TP, the variation coefficient G is set to become larger as the speed change process TP progresses in the first stage $\alpha 1$, which is the first stage of the speed change process TP, and to become smaller as the speed change process TP progresses in the third stage $\alpha 3$, which is the last stage of the speed change process TP. In the first stage $\alpha 1$, the degree of progress $\alpha$ of the speed change process TP is equal to or less than a predetermined value. In the embodiment, the first stage $\alpha 1$ is a period of $0 \leq \alpha \leq 0.4$. In the third stage $\alpha 3$, the degree of progress $\alpha$ of the speed change process TP is equal to or more than a predetermined value. In the embodiment, the third stage $\alpha 3$ is a period of $0.6 \leq \alpha \leq 1$. In the embodiment, in the second stage $\alpha 2$, which is between the first stage $\alpha 1$ and the third stage $\alpha 3$ and is a period of $0.4 < \alpha < 0.6$, the variation coefficient G is set to a constant value irrespective of the degree of progress a of the speed change process TP. As is clear from the map of FIG. 6, in the third stage $\alpha 3$, the variation rate (lowering rate) of the variation coefficient G with respect to the degree of progress $\alpha$ is larger in a first half portion $\alpha 31$ of the third stage $\alpha 3$ than in a second half portion $\alpha 32$. Meanwhile, the absolute value of the variation rate (rising rate) of the variation coefficient G with respect to the degree of progress $\alpha$ in the first stage $\alpha 1$ is smaller than the absolute value of the variation rate (lowering rate) of the variation coefficient G in the first half portion $\alpha 31$ of the third stage $\alpha 3$, and larger than the absolute value of the variation rate (lowering rate) of the variation coefficient G in the second half portion $\alpha 32$ of the third stage $\alpha 3$.

Under conditions that the degree of progress $\alpha$ of the speed change process TP is equal, and in the case where the output torque of the rotary electric machine 12 is negative, the variation coefficient G is set to become larger as the output torque of the rotary electric machine 12 is varied in the positive direction (to become smaller as the output torque of the rotary electric machine 12 is varied in the negative direction). In the embodiment, the variation coefficient G is set to a value that becomes gradually smaller as the negative torque (regenerative torque) output by the rotary electric machine 12 becomes higher with reference to a state (G=1) in which the output torque of the rotary electric machine 12 is zero and no power or electric power is generated, and that is always zero irrespective of the degree of progress $\alpha$ when the absolute value of the negative torque output by the rotary electric machine 12 is equal to or more than a predetermined value (in the illustrated example, regenerative torque of 300 [N·m]). While FIG. 6 shows only the relationship for cases where the output torque of the rotary electric machine 12 is negative (inclusive of zero), the relationship for cases where the output torque of the rotary electric machine 12 is positive is the same as that for a case where the output torque of the rotary electric machine 12 is zero in the embodiment. While FIG. 6 only shows the relationship for four representative values of the output torque of the rotary electric machine 12, the relationship may be defined for a larger number of values of the output torque. The variation coefficient map shown in FIG. 6 is merely exemplary, and may be modified appropriately in accordance with vehicle characteristics or the like.

The engagement hydraulic pressure control section 38 varies the engagement hydraulic pressure on the basis of the variation coefficient G which is determined on the basis of the degree of progress a of the speed change process TP and the output torque of the rotary electric machine 12, and the reference hydraulic pressure variation amount $\Delta Pb$ with reference to the engagement hydraulic pressure at the start of the speed change process TP. That is, in the embodiment, the product of the reference hydraulic pressure variation amount $\Delta Pb$ and the variation coefficient G is derived as the variation amount of the engagement hydraulic pressure matching the degree of progress $\alpha$ of the speed change process TP and the output torque of the rotary electric machine 12, and is added to the engagement hydraulic pressure at the start of the speed change process TP to determine a command value of the engagement hydraulic pressure at each time point in the speed change process TP. Then, the engagement hydraulic pressure control section 38 varies the actual engagement pressure so as to follow the command value of the engagement hydraulic pressure. This allows the engagement hydraulic pressure to vary on the basis of the reference hydraulic pressure variation amount ΔPb and in accordance with the degree of progress α of the speed change process TP and the output torque of the rotary electric machine 12. Specifically, the engagement hydraulic pressure is varied to rise, be constant, lower, and gently lower along with the progress of the speed change process TP over a variation range that is wider as the absolute value of the negative torque (regenerative torque) output by the rotary electric machine 12 is smaller. The engagement hydraulic pressure at the start of the speed change process TP is a pressure at which the engagement element can be engaged quickly by slightly raising the engagement hydraulic pressure. The first engagement control described above is executed in coordination with a decrease in disengagement hydraulic pressure in the disengagement special speed change control.

Figure 9:
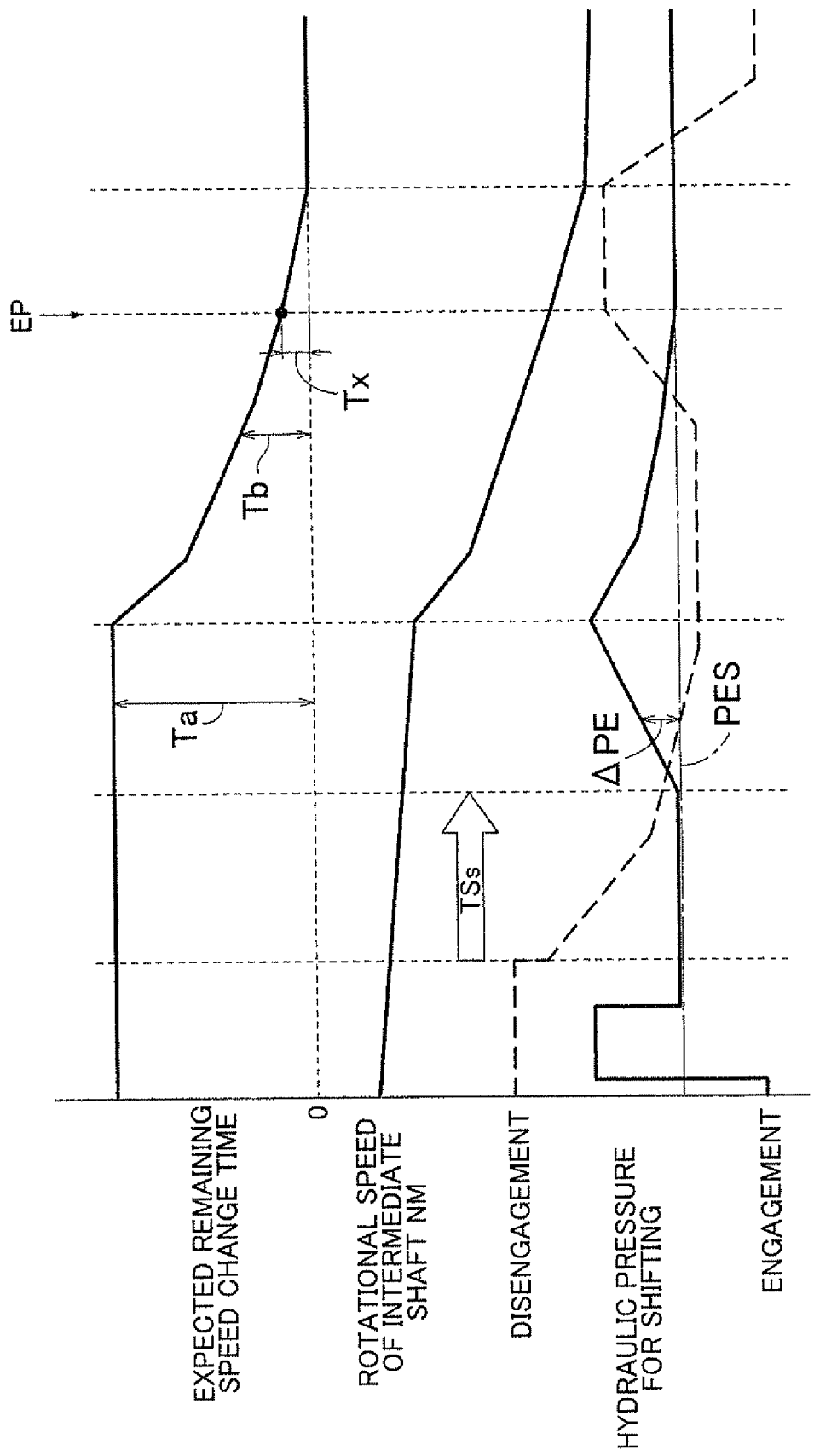
FIG. 9 illustrates pressure increase correction control according to the embodiment.

In the embodiment, the engagement hydraulic pressure controlled by the engagement hydraulic pressure control section 38 as described above is defined as an "engagement reference hydraulic pressure PES" (see FIG. 9). The engagement reference hydraulic pressure PES basically represents a hydraulic pressure, the magnitude of which varies in accordance with the degree of progress a of the speed change process TP. It should be noted that the engagement reference hydraulic pressure PES may be a constant value irrespective of the degree of progress a of the speed change process TP depending on the magnitude of the negative torque (regenerative torque) output by the rotary electric machine 12 (see FIGS. 6 and 9).

As the absolute value of the negative torque (regenerative torque) output by the rotary electric machine 12 becomes smaller, the rotational speed of the intermediate shaft M may be lowered more slowly, by maintaining the disengagement element in the slipping state, to extend the speed change time uselessly. When the speed change time is extended to be long, shift feeling may be deteriorated. In this respect, by controlling the engagement hydraulic pressure in accordance with the engagement reference hydraulic pressure PES as described above, a decrease in rotational speed of the intermediate shaft M, which tends to be slow when the disengagement element is maintained in the slipping state, is compensated for with variations in engagement hydraulic pressure, which makes it easy to appropriately terminate a speed change operation within the target speed change time Tt.

Even in the case where the engagement hydraulic pressure is controlled in accordance with the engagement reference hydraulic pressure PES as described above, there may be a delay in slipping of the disengagement element after the disengagement hydraulic pressure is lowered to result in a delay in a decrease in rotational speed of the intermediate shaft M. In this case, the speed change time may be extended to become uselessly long, and shift feeling may be deteriorated. Thus, in the embodiment, in the case where slipping of the disengagement element is not detected within a predetermined slipping determination reference time (here, defined as TSs) with reference to a time point when the disengagement hydraulic pressure control section 37 lowers the disengagement hydraulic pressure at the start of the special speed change control, the engagement hydraulic pressure control section 38 performs pressure increase correction control in which the engagement hydraulic pressure is raised until slipping of the disengagement element is detected. In the pressure increase correction control, the engagement hydraulic pressure is controlled. The pressure increase correction control is executed as a part of the first engagement control, and executed independently of the control performed on the engagement hydraulic pressure in accordance with the engagement reference hydraulic pressure PES. That is, in the case where the disengagement element does not start slipping within the slipping determination reference time TSs after the disengagement hydraulic pressure starts decreasing, the engagement hydraulic pressure control section 38 executes the pressure increase correction control, while controlling the engagement hydraulic pressure in accordance with the engagement reference hydraulic pressure PBS, to perform pressure increase correction in which the engagement hydraulic pressure is further raised with respect to the engagement reference hydraulic pressure PBS.

FIG. 9 illustrates the pressure increase correction control according to the embodiment. In the drawing, an expected remaining speed change time, the rotational speed NM of the intermediate shaft M, the engagement hydraulic pressure, and the disengagement hydraulic pressure are shown sequentially from the upper side. In respect to the engagement hydraulic pressure, the engagement reference hydraulic pressure PES is indicated by the dash-dotted line, and the engagement hydraulic pressure after the pressure increase correction is indicated by the solid line. In the embodiment, the engagement reference hydraulic pressure PES is maintained at a constant value that is not varied. In the case where the engagement reference hydraulic pressure PES is varied over time, however, a value obtained by adding a pressure increase correction pressure ΔPE at each time point to the engagement reference hydraulic pressure PES at each time point is used as the engagement hydraulic pressure at each time point after the pressure increase correction.

In the embodiment, as shown in FIG. 9, in the pressure increase correction control, the engagement hydraulic pressure control section 38 raises the engagement hydraulic pressure at a constant pressure increase variation rate with respect to the engagement reference hydraulic pressure PES. The pressure increase correction control is executed until the disengagement element starts slipping. As described above, the time point when the disengagement element starts slipping coincides with the start of the speed change process TP. In the embodiment, the time point when the disengagement element starts slipping can be determined on the basis of the rotational speed difference ΔN1 before switching between shift speeds acquired by the rotation difference acquisition section 35. Even in the case where there is a delay in slipping of the disengagement element after the disengagement hydraulic pressure is lowered to result in a delay in a decrease in rotational speed of the intermediate shaft M (a delay in the start of the speed change process TP), execution of the pressure increase correction control promotes the disengagement element to slip and the rotational speed NM of the intermediate shaft M to lower, which suppresses a delay in the start of the speed change process TP and deterioration of shift feeling.

After it is detected that the disengagement element has started slipping as a result of execution of the pressure increase correction control, the engagement hydraulic pressure control section 38 gradually reduces the engagement hydraulic pressure by an amount (the pressure increase correction pressure APE) by which the engagement hydraulic pressure has been raised through the pressure increase correction control to finally lower the engagement hydraulic pressure to the engagement reference hydraulic pressure PES before the termination of the speed change process TP. In the embodiment, the engagement hydraulic pressure control section 38 gradually lowers the engagement hydraulic pressure in accordance with a predicted time since the current time point until a predetermined pressure increase termination time point EP set before the termination of the speed change process TP such that the engagement hydraulic pressure becomes the engagement reference hydraulic pressure PES at the pressure increase termination time point EP. More specifically, defining the pressure increase correction pressure ΔPE at the time point when the disengagement element starts slipping as a reference pressure increase correction pressure ΔPEb, the expected remaining speed change time at the time point when the disengagement element starts slipping as Ta, the current expected remaining speed change time as Tb, and a predetermined allowable time set from the pressure increase termination time point EP to the time point when the speed change process TP is terminated as Tx, the pressure increase correction pressure APE at each time point in the speed change process TP is derived at predetermined intervals as follows:

$$\Delta PE = \Delta PEb*(Tb-Tx)/(Ta-Tx) \qquad \text{(Formula 4)}$$

In each pressure increase correction control, the reference pressure increase correction pressure ΔPEb, the expected remaining speed change time Ta, and the allowable time Tx are each a constant, and the expected remaining speed change time Tb is a variable. Then, the engagement hydraulic pressure control section 38 controls the engagement hydraulic pressure at each time point to a value obtained by adding the engagement reference hydraulic pressure PES and the pressure increase correction pressure APE at each time point derived in accordance with (Formula 4) above.

Consequently, in the embodiment, an excessive rise in tie-up rate is suppressed by lowering the engagement hydraulic pressure back by an amount corresponding to the pressure increase correction pressure ΔPE, by which the engagement hydraulic pressure has been raised through the pressure increase correction control, after the disengagement element starts slipping. In particular, even in the case where the rotational speed control is executed after the switching point in the speed change process TP and the disengagement hydraulic pressure which has been lowered temporarily is raised again in the final stage of the speed change process TP as in the embodiment, an excessive rise in tie-up rate can be suppressed effectively. In the embodiment, in addition, the engagement hydraulic pressure is lowered by an amount corresponding to the pressure increase correction pressure ΔPE in accordance with the predicted time (Tb−Tx) from the current time point to the pressure increase termination time point EP, and thus the engagement hydraulic pressure can be reliably reduced by an amount corresponding to the pressure increase correction pressure ΔPE at the pressure increase termination time point EP before the termination of the speed change process TP. In this event, immediately after the disengagement element starts slipping, the engagement hydraulic pressure has been increased through the pressure increase correction, and the rotational acceleration AM (here, deceleration) of the intermediate shaft M is relatively high. Thus, the expected remaining speed change time Tb is reduced relatively rapidly. Hence, even in the case where the start of slipping of the disengagement element is delayed, the speed change time after the start of slipping of the disengagement element can be shortened to suppress extension of the speed change time as a whole.

The expected remaining speed change time Ta at the time point when the disengagement element starts slipping is equal to the target speed change time Tt described earlier. The expected remaining speed change time Tb at each time point can be acquired on the basis of the rotational speed difference ΔN2 after switching between shift speeds and the rotational acceleration AM of the intermediate shaft M at that time point, as the quotient of the rotational speed difference ΔN2 divided by the rotational acceleration AM. In the case where the disengagement element starts slipping within the slipping determination reference time TSs after the disengagement hydraulic pressure starts lowering, the pressure increase correction control is not executed, and the engagement hydraulic pressure control section 38 controls the engagement hydraulic pressure in accordance with the engagement reference hydraulic pressure PES.

The first engagement control is executed until the rotational speed difference ΔN2 between the post-switching target rotational speed NT2 and the actual rotational speed NM of the intermediate shaft M acquired by the rotation difference acquisition section 35 becomes equal to or less than a predetermined value as long as the special speed change control transition conditions are satisfied. In the embodiment, the predetermined value is set to a value that is equal to the reference value for determining the termination of the rotational speed control and the reference value for determining the termination of the speed change process TP. Thus, in the embodiment, the first engagement control, the rotational speed control, and the speed change process TP are terminated at the same timing.

In the case where the rotational speed difference ΔN2 after switching between shift speeds acquired by the rotation difference acquisition section 35 becomes equal to or less than a predetermined value, then the second engagement control is executed. In the second engagement control, the engagement hydraulic pressure control section 38 controls the engagement hydraulic pressure so as to completely engage the engagement element after the rotational speed difference ΔN2 becomes equal to or less than a predetermined value and the speed change process TP is terminated. In the embodiment, the engagement hydraulic pressure control section 38 raises the engagement hydraulic pressure to a complete engagement pressure in one stroke after the speed change process TP is terminated.

A case where the special speed change control transition conditions are satisfied by upshifting the target shift speed for the speed change mechanism 14 in the small acceleration operation amount state has been described above. However, the special speed change control is executed in the same way in the case where the special speed change control transition conditions are satisfied by upshifting the target shift speed for the speed change mechanism 14 in the negative torque prediction established state. It should be noted that in this case, the first limit hydraulic pressure PL1, of the two limit hydraulic pressures defining the lower limit value of the disengagement hydraulic pressure, is set in accordance with the "predicted input torque PTi" in place of the "regenerative torque of the rotary electric machine 12". That is, the limit hydraulic pressure determination section 39 sets the first limit hydraulic pressure PL1 to a value matching the magnitude of the predicted input torque PTi. That is, the limit hydraulic pressure determination section 39 sets the first limit hydraulic pressure PL1 to a value that is equal to the stroke end pressure Pse for the disengagement element at the time point when the predicted input torque PTi is zero, and that becomes larger as the predicted input torque PTi becomes higher in the negative direction (see the parentheses of FIG. 4).

5. Procedure of Speed Change Control Process

Figure 10:
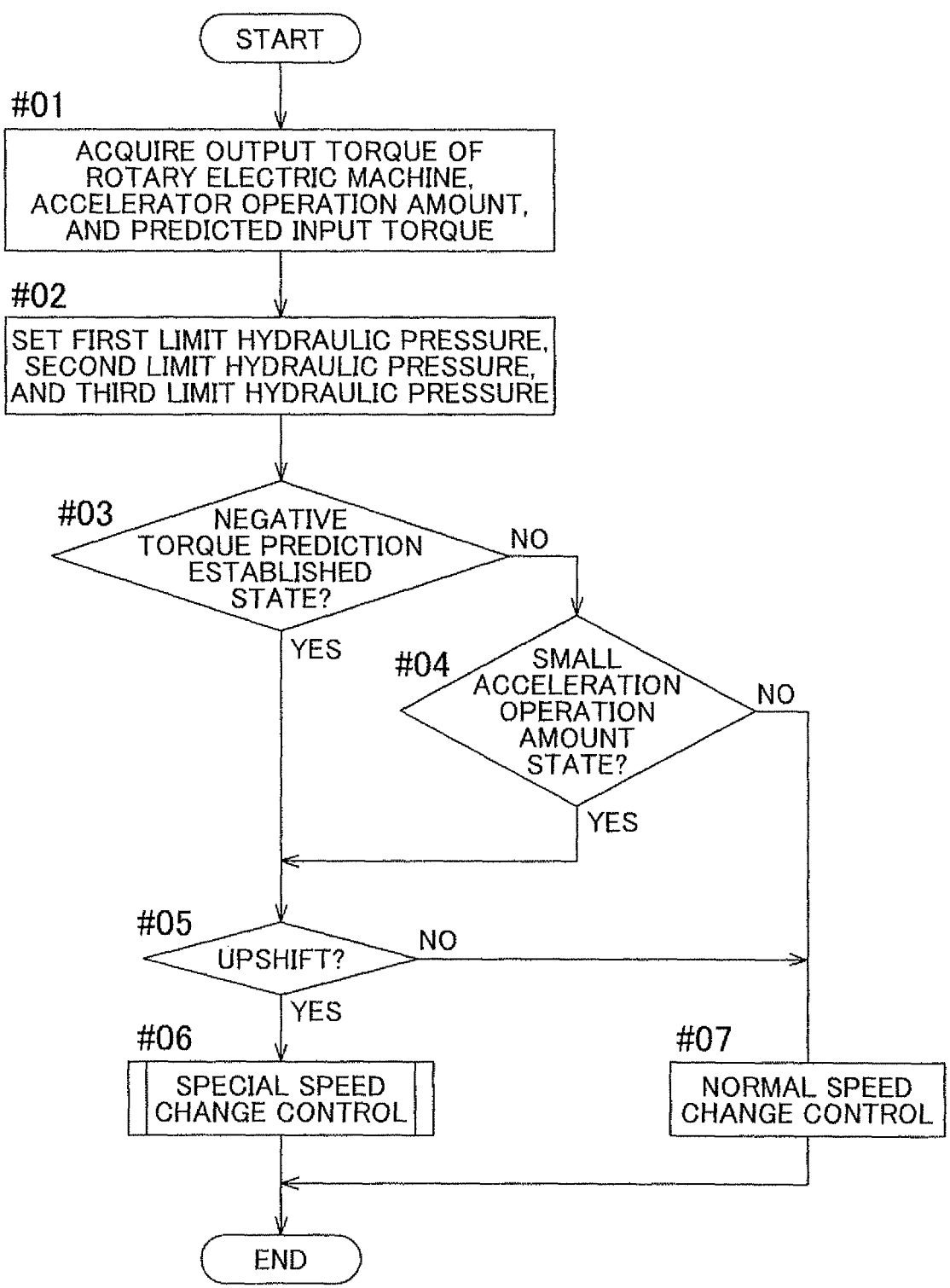
FIG. 10 is a flowchart showing the overall process procedure of a speed change control process according to the embodiment.
Figure 12:
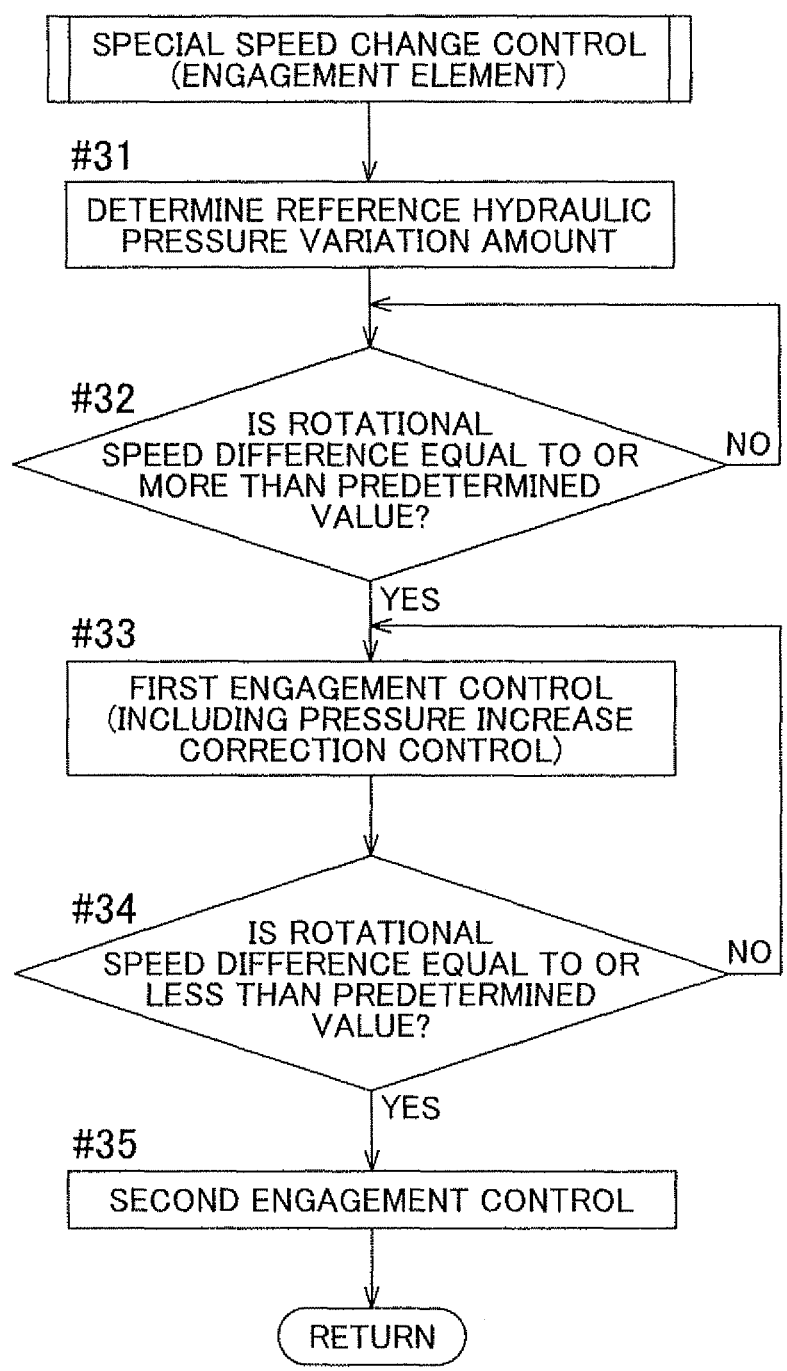
FIG. 12 is a flowchart showing the process procedure of an engagement special speed change control process according to the embodiment.

Next, the content of control for the vehicle drive device 1 including the transmission device 2 according to the embodiment will be described. FIG. 10 is a flowchart showing the overall process procedure of a speed change control process for the vehicle drive device 1 according to the embodiment. FIG. 11 is a flowchart showing the process procedure of a disengagement special speed change control process, which is a special speed change control process for the disengagement element, of the special speed change control process of step #06 of FIG. 10. FIG. 12 is a flowchart showing the process procedure of an engagement special speed change control process, which is a special speed change control process for the engagement element, of the special speed change control process of step #06 of FIG. 10. The procedure of the speed change control process for the vehicle drive device 1 described below is executed by the functional sections 32 to 40 of the control unit 31. In the case where the functional sections 32 to 40 of the control unit 31 are implemented by a program, the arithmetic processing unit provided in the control unit 31 operates as a computer that executes the program implementing the functional sections 32 to 40.

5-1. Overall Procedure of Speed Change Control Process

In the speed change control process according to the embodiment, first, the output torque of the rotary electric machine 12, the accelerator operation amount, and the predicted input torque PTi are acquired (step #01). In the embodiment, the output torque of the rotary electric machine 12 is acquired as the torque command value determined by the rotary electric machine control section 33. The accelerator operation amount is detected and acquired by the accelerator operation amount detection sensor Se4. The predicted input torque PTi is derived and acquired by the input torque prediction section 40. The limit hydraulic pressure determination section 39 determines the first limit hydraulic pressure PL1 matching the output torque of the rotary electric machine 12 on the basis of the acquired output torque of the rotary electric machine 12, determines the second limit hydraulic pressure PL2 matching the accelerator operation amount on the basis of the acquired accelerator operation amount, and further sets the third limit hydraulic pressure PL3 serving as a predetermined value (step #02). Next, it is determined whether or not the state of the vehicle satisfies the special speed change control transition conditions. That is, it is determined whether or not the vehicle is in the negative torque prediction established state (step #03), whether or not the vehicle is in the small acceleration operation amount state (step #04), and whether or not an upshift of the target shift speed for the speed change mechanism 14 is requested (step #05). In the embodiment, it is determined that the vehicle is in the small acceleration operation amount state in the case where the accelerator operation amount detected by the accelerator operation amount detection sensor Se4 is equal to or less than a predetermined value (in the embodiment, 1%).

In the case where it is determined that the vehicle is in the negative torque prediction established state (step #03: Yes) or in the small acceleration operation amount state (step #04: Yes), and it is determined that an upshift of the target shift speed is requested (step #05: Yes), the switching control section 36 executes the special speed change control (step #06). The process procedure of the special speed change control will be discussed in detail later. On the other hand, in the case where it is determined that the vehicle is not in the negative torque prediction established state (step #03: No) or in the small acceleration operation amount state (step #04: No), or in the case where it is determined that an upshift of the target shift speed is not requested (step #05: No), the switching control section 36 executes the normal speed change control (step #07). In the normal speed change control, the disengagement element is disengaged quickly in the initial stage of the speed change process TP, and the engagement element is completely engaged through a slipping state. The processes of steps #01 to #07 are sequentially repeatedly executed while the vehicle is traveling.

5-2. Overall Procedure of Special Speed Change Control Process

Next, the process procedure of the special speed change control process of step #06 will be described in detail. The special speed change control process includes the disengagement special speed change control process for the disengagement element and the engagement special speed change control process for the engagement element. In the disengagement special speed change control process shown in FIG. 11, first, the standby control is executed (step #21). In the standby control, the disengagement hydraulic pressure is kept at a pressure matching the output torque until a certain time elapses. When it is determined by the internal timer that the certain time has elapsed (step #22: Yes), then the variation rate control is executed (step #23). In the variation rate control, the disengagement hydraulic pressure is lowered at a variation rate matching the magnitude of the output torque of the rotary electric machine 12 (in the negative torque prediction established state, the predicted input torque PTi). The variation rate control is executed continuously as long as the special speed change control transition conditions are satisfied. In parallel with the variation rate control, it is determined whether or not the speed change process TP has reached the switching point (step #24). In the embodiment, the switching point is defined as a time point when the speed change operation has progressed by 50% (a time point when the degree of progress α has reached 0.5).

The variation rate control is executed continuously when the switching point is not reached (step #24: No). When it is determined that the degree of progress of the speed change operation has reached 50% and that the switching point is reached (step #24: Yes), then the rotational speed control is executed (step #25). In the rotational speed control, the disengagement hydraulic pressure is varied such that the actual rotational acceleration AM of the intermediate shaft M serving as the input shaft of the transmission device 2 follows the target rotational acceleration AT at each time point. The rotational speed control is executed continuously as long as the special speed change control transition conditions are satisfied. In parallel with the rotational speed control, it is determined whether or not the rotational speed difference ΔN2 is equal to or less than a predetermined value (step #26). In this case, in the embodiment, the predetermined value is set to a value that makes it possible to recognize the occurrence of a deviation between the actual rotational speed of the intermediate shaft M and the target rotational speed NT2 after switching between shift speeds. The rotational speed control is executed continuously while the rotational speed difference ΔN2 is not equal to or less than the predetermined value (step #26: No). When the rotational speed difference ΔN2 becomes equal to or less than the predetermined value (step #26: Yes), then the disengagement control is executed (step #27). In the disengagement control, the disengagement element is quickly completely disengaged. Although not shown in the flowchart of FIG. 11, also in the case where the special speed change control transition conditions are not satisfied any more during execution of the variation rate control or the rotational speed control, the disengagement control is executed (step #27). The disengagement special speed change control process is thus terminated.

In the engagement special speed change control process shown in FIG. 12, first, the reference hydraulic pressure variation amount ΔPb is determined (step #31). The reference hydraulic pressure variation amount ΔPb is determined on the basis of the target speed change time Tt and the rotational speed variation range W. Next, it is determined whether or not the rotational speed difference ΔN1 is equal to or more than a predetermined value (step #32). In this case, in the embodiment, the predetermined value is set to a value that makes it possible to recognize the occurrence of a deviation between the actual rotational speed of the intermediate shaft M and the target rotational speed NT1 before switching between shift speeds. When it is determined that the rotational speed difference ΔN1 has become equal to or more than the predetermined value (step #32: Yes), then the first engagement control is executed, and under predetermined conditions, the pressure increase correction control is executed in parallel with the first engagement control (step #33). In the first engagement control, the engagement hydraulic pressure is varied in accordance with the engagement reference hydraulic pressure PES, which matches the degree of progress α of the speed change process TP and the output torque of the rotary electric machine 12, on the basis of the reference hydraulic pressure variation amount ΔPb. The process procedure of the pressure increase correction control will be discussed in detail later. The first engagement control is executed continuously as long as the special speed change control transition conditions are satisfied. In parallel with the first engagement control, it is determined whether or not the rotational speed difference ΔN2 is equal to or less than a predetermined value (step #34).

The rotational speed control is executed continuously while the rotational speed difference ΔN2 is not equal to or less than the predetermined value (step #34: No). When the rotational speed difference ΔN2 becomes equal to or less than the predetermined value (step #34: Yes), then the second engagement control is executed (step #35). In the second engagement control, the engagement hydraulic pressure is raised to a complete engagement pressure in one stroke after the rotational speed difference ΔN2 becomes equal to or less than the predetermined value and the speed change process TP is terminated. The engagement special speed change control process is thus terminated. Although not shown in the flowchart of FIG. 12, in the case where the special speed change control transition conditions are not satisfied any more during execution of the first engagement control, the engagement special speed change control process is terminated, and engagement hydraulic pressure control in the normal speed change control (step #07) is executed.

Figure 13:
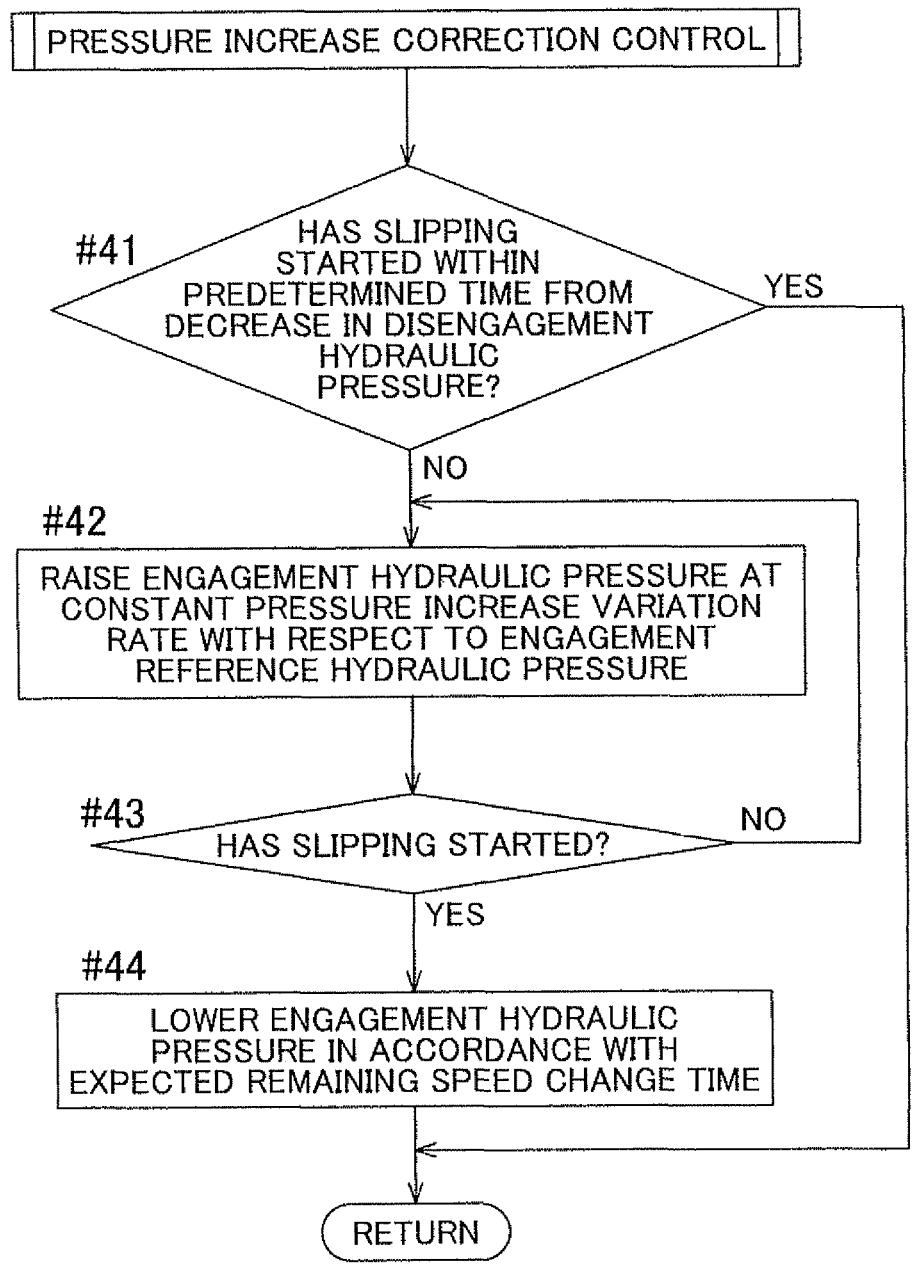
FIG. 13 is a flowchart showing the process procedure of a pressure increase correction control process according to the embodiment.

In the pressure increase correction control process shown in FIG. 13, first, it is determined whether or not the disengagement element has started slipping within the predetermined slipping determination reference time TSs with reference to the time point when the disengagement hydraulic pressure control section 37 lowers the disengagement hydraulic pressure (step #41). The time point when the disengagement element starts slipping can be determined on the basis of the rotational speed difference ΔN1 before switching between shift speeds. In the case where it is determined that the disengagement element has started slipping within the slipping determination reference time TSs (step #41: Yes), the substantial content of the pressure increase correction control is not executed, and the pressure increase correction control process is terminated. On the other hand, in the case where it is determined that the disengagement element has not started slipping within the slipping determination reference time TSs (step #41: No), the substantial content of the pressure increase correction control is executed. That is, the engagement hydraulic pressure control section 38 further raises the engagement hydraulic pressure at a constant pressure increase variation rate with reference to the engagement reference hydraulic pressure PES (step #42). The pressure increase correction for the engagement hydraulic pressure is executed continuously until the disengagement element actually starts slipping (step #43). When it is determined that the disengagement element has started slipping (step #43: Yes), then the engagement hydraulic pressure control section 38 lowers the engagement hydraulic pressure in accordance with the predicted time from the current time point to the pressure increase termination time point EP (step #44) such that the engagement hydraulic pressure finally becomes the engagement reference hydraulic pressure PES at the pressure increase termination time point EP. The pressure increase correction control process is thus terminated, and the process returns to the process of step #33 in the engagement special speed change control process.

6. Specific Example of Speed Change Control Process

Next, a specific example of a case where the vehicle drive device 1 including the transmission device 2 is controlled in accordance with the speed change control process according to the embodiment will be described with reference to FIGS. 14 to 20. In the drawings, the rotational speed NM of the intermediate shaft M, the output torque of the rotary electric machine 12, the predicted input torque PTi, a brake operation performed by the driver, the accelerator operation amount, an upshift request, the disengagement hydraulic pressure, and the engagement hydraulic pressure are shown sequentially from the upper side. The first limit hydraulic pressure PL1 and the second limit hydraulic pressure PL2 are shown over the disengagement hydraulic pressure and the engagement hydraulic pressure.

FIG. 14 is a timing chart showing an exemplary case where a speed change operation is performed through the normal speed change control. In the example shown in FIG. 14, the speed change mechanism 14 performs an upshift (power-on upshift) with the accelerator operation amount of the vehicle larger than the accelerator operation amount (in the example, 1%) defining the small acceleration operation amount state. In this case, the special speed change control transition conditions are not satisfied, and thus the normal speed change control is executed. In the example, at time T11, an upshift request is turned on with the accelerator operation amount maintained at a predetermined magnitude. During a period from time T11 to time T12, the disengagement hydraulic pressure is kept at a pressure matching the output torque, and the engagement hydraulic pressure is maintained at a predetermined pressure after preliminary filling is completed.

Thereafter, over a period from time T12 to time T13, the disengagement hydraulic pressure is lowered rapidly to quickly disengage the disengagement element in the initial stage of the speed change process TP. Meanwhile, over a period from time T12 to time T14, the engagement hydraulic pressure is varied so as to vary the rotational speed NM of the intermediate shaft M at the predetermined target rotational acceleration AT. Further, at time T15, the engagement hydraulic pressure is raised to the complete engagement pressure to completely engage the engagement element. The speed change process TP is thus terminated. In the example, over the entire speed change process TP, the accelerator operation amount and the positive torque output by the rotary electric machine 12 are each maintained at a relatively large value, and the first limit hydraulic pressure PL1 and the second limit hydraulic pressure PL2 are each set to a value that is sufficiently smaller than the stroke end pressure Pse for the disengagement element. Hence, the disengagement hydraulic pressure is varied without being restricted by the first limit hydraulic pressure PL1 or the second limit hydraulic pressure PL2.

Figure 15:
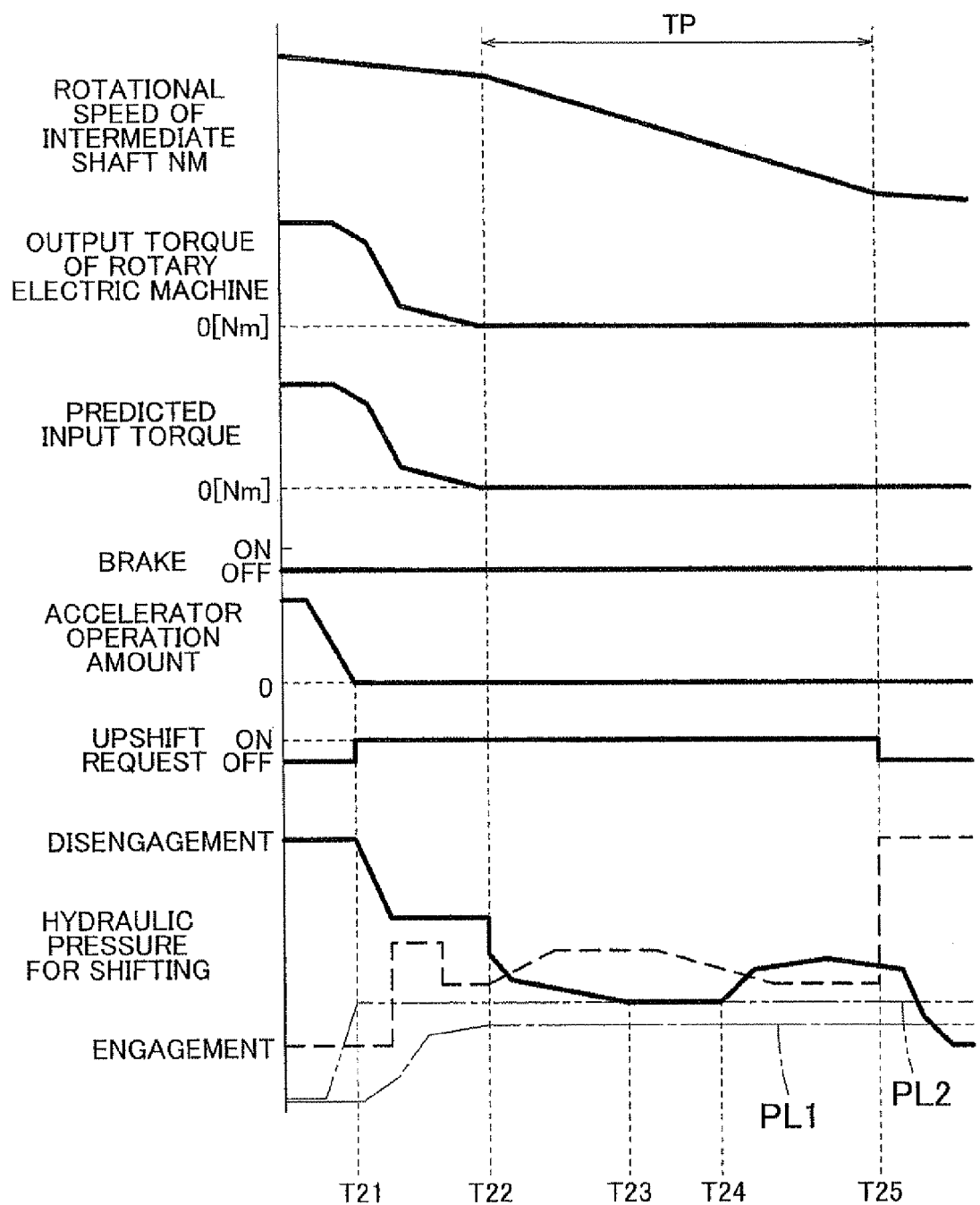
FIG. 15 is a timing chart illustrating an example of a special speed change control process according to the embodiment.

FIG. 15 is a timing chart showing an exemplary case where a speed change operation is performed through the special speed change control. In the example, the predicted input torque PTi substantially coincides with the output torque of the rotary electric machine 12. In the example shown in FIG. 15, the speed change mechanism 14 performs an upshift (power-off upshift) in the small acceleration operation amount state in which the accelerator operation amount of the vehicle is equal to or less than a predetermined value. In this case, the special speed change control transition conditions are satisfied, and thus the special speed change control is executed. When the accelerator operation amount becomes zero at time T21, the output torque of the rotary electric machine 12 is gradually reduced to become zero at time T22. At time T21, an upshift request is turned on. In the example, a brake operation is not performed by the driver, and the output torque of the rotary electric machine 12 is kept at zero over the entire speed change process TP. Consequently, in the example, the second limit hydraulic pressure PL2 is higher than the first limit hydraulic pressure PL1 and the stroke end pressure Pse for the disengagement element over the entire speed change process TP. During a period from time T21 to time T22, the disengagement hydraulic pressure is kept at a pressure matching the output torque, and the engagement hydraulic pressure is maintained at a predetermined pressure after preliminary filling is completed. Thereafter, over a period from time T22 to time T25, the disengagement hydraulic pressure is controlled so as to maintain the disengagement element in the slipping state over the entire speed change process TP.

More particularly, during a period from time T22 to time T24, the variation rate control is executed, and the disengagement hydraulic pressure is gradually lowered at a pressure reduction variation rate matching the magnitude of the negative torque (regenerative torque) output by the rotary electric machine 12. However, the disengagement hydraulic pressure reaches the second limit hydraulic pressure PL2, which is the higher one of the first limit hydraulic pressure PL1 and the second limit hydraulic pressure PL2, at time T23. Thus, the disengagement hydraulic pressure is not lowered any further, but maintained at the second limit hydraulic pressure PL2 during a period from time T23 to time T24. Then, at a time point when the speed change operation has progressed by 50% at time T24, that is, at the switching point, switching is performed from the variation rate control to the rotational speed control. In the rotational speed control, the disengagement hydraulic pressure is varied such that the actual rotational acceleration AM of the intermediate shaft M follows the target rotational acceleration AT at each time point. In the illustrated example, over a period from time T24 to time T25, the disengagement hydraulic pressure is raised once, and maintained at a generally constant pressure thereafter.

Over the entire speed change process TP, which extends from time T22 to time T25, the engagement hydraulic pressure is varied in coordination with variations in disengagement hydraulic pressure such that the actual rotational acceleration AM of the intermediate shaft M follows the target rotational acceleration AT. In the example, the output torque of the rotary electric machine 12 is kept at zero over the entire speed change process TP. Thus, the engagement hydraulic pressure (engagement reference hydraulic pressure PES) is varied to rise, be constant, lower, and be constant over a relatively wide variation range along with the progress of the speed change process TP. Thereafter, when the rotational speed difference ΔN2 becomes equal to or less than a predetermined value at time T25, the engagement hydraulic pressure is raised to the complete engagement pressure, and thereafter the disengagement hydraulic pressure is brought to zero quickly. The speed change process TP is thus terminated.

Figure 16:
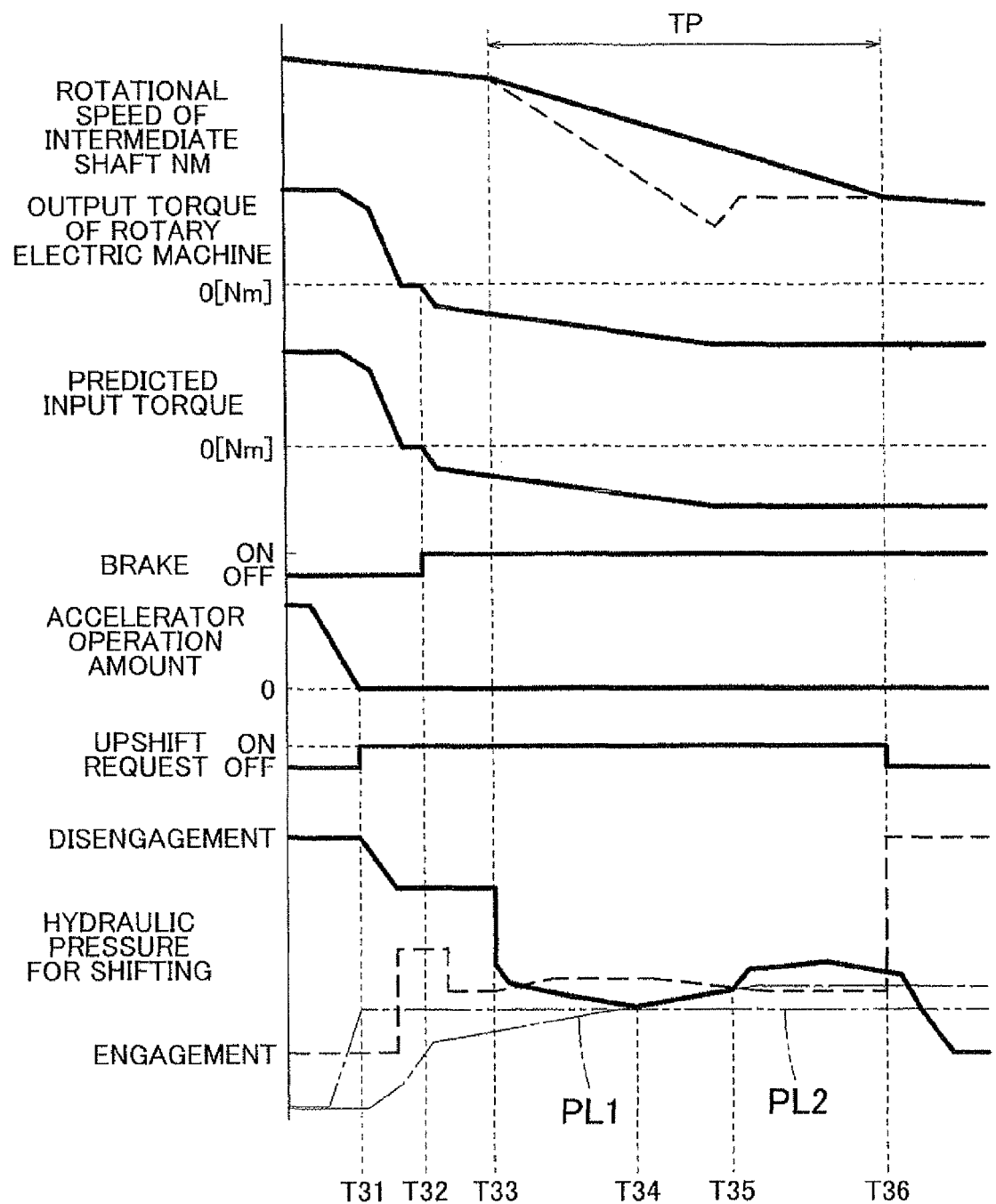
FIG. 16 is a timing chart illustrating an example of the special speed change control process according to the embodiment.

FIG. 16 is a timing chart showing another exemplary case where a speed change operation is performed through the special speed change control. In the example, the predicted input torque PTi substantially coincides with the output torque of the rotary electric machine 12. In the example shown in FIG. 16, as with FIG. 15, the speed change mechanism 14 performs an upshift (power-off upshift) in the small acceleration operation amount state in which the accelerator operation amount of the vehicle is equal to or less than a predetermined value. In this case, the special speed change control transition conditions are satisfied, and thus the special speed change control is executed. When the accelerator operation amount becomes zero at time T31, the output torque of the rotary electric machine 12 is gradually reduced to become zero at time T32. At time T31, an upshift request is turned on. In the example, a brake operation is performed by the driver at and after time T32. The rotary electric machine 12 performs regeneration (off-upshift regeneration) while outputting negative torque to brake the vehicle on the basis of a deceleration request due to the brake operation. In the example, in addition, as the speed change process TP progresses, the negative torque output by the rotary electric machine 12 becomes gradually higher, and accordingly the first limit hydraulic pressure PL1 also becomes gradually higher. The second limit hydraulic pressure PL2 is higher than the first limit hydraulic pressure PL1 before time T34, the first limit hydraulic pressure PL1 is higher than the second limit hydraulic pressure PL2 at and after time T34. In either case, the first limit hydraulic pressure PL1 and the second limit hydraulic pressure PL2 are higher than the stroke end pressure Pse for the disengagement element. During a period from time T31 to time T33, the disengagement hydraulic pressure is kept at a pressure matching the output torque, and the engagement hydraulic pressure is maintained at a predetermined pressure after preliminary filling is completed. Thereafter, over a period from time T33 to time T36, the disengagement hydraulic pressure is controlled so as to maintain the disengagement element in the slipping state over the entire speed change process TP.

More particularly, during a period from time T33 to time T35, the variation rate control is executed, and the disengagement hydraulic pressure is gradually lowered at a pressure reduction variation rate matching the magnitude of the negative torque (regenerative torque) output by the rotary electric machine 12. However, the disengagement hydraulic pressure reaches the first limit hydraulic pressure PL1, which is the higher one of the first limit hydraulic pressure PL1 and the second limit hydraulic pressure PL2, at time T34. Thus, the disengagement hydraulic pressure is not lowered any further, but maintained at the first limit hydraulic pressure PL1 during a period from time T34 to time T35. As described above, as the speed change process TP progresses, the first limit hydraulic pressure PL1 becomes gradually higher, and accordingly the disengagement hydraulic pressure also gradually rises. Then, at a time point when the speed change operation has progressed by 50% at time T35, that is, at the switching point, switching is performed from the variation rate control to the rotational speed control. In the rotational speed control, the disengagement hydraulic pressure is varied such that the actual rotational acceleration AM of the intermediate shaft M follows the target rotational acceleration AT at each time point. In the illustrated example, over a period from time T35 to time T36, the disengagement hydraulic pressure is raised once, and maintained at a generally constant pressure thereafter.

Over the entire speed change process TP, which extends from time T33 to time T36, the engagement hydraulic pressure is varied in coordination with variations in disengagement hydraulic pressure such that the actual rotational acceleration AM of the intermediate shaft M follows the target rotational acceleration AT. In the example, the rotary electric machine 12 outputs negative torque (regenerative torque) over the entire speed change process TP. Thus, the engagement hydraulic pressure is varied to rise, be constant, lower, and be constant over a relatively narrow variation range along with the progress of the speed change process TP. That is, as can be well understood by comparing FIGS. 15 and 16, the engagement hydraulic pressure is varied over a variation range that is narrower than that in the case where the output torque of the rotary electric machine 12 is kept at zero along with the progress of the speed change process TP. Thereafter, when the rotational speed difference ΔN2 becomes equal to or less than a predetermined value at time T36, the engagement hydraulic pressure is raised to the complete engagement pressure, and thereafter the disengagement hydraulic pressure is brought to zero quickly. The speed change process TP is thus terminated.

Figure 17:
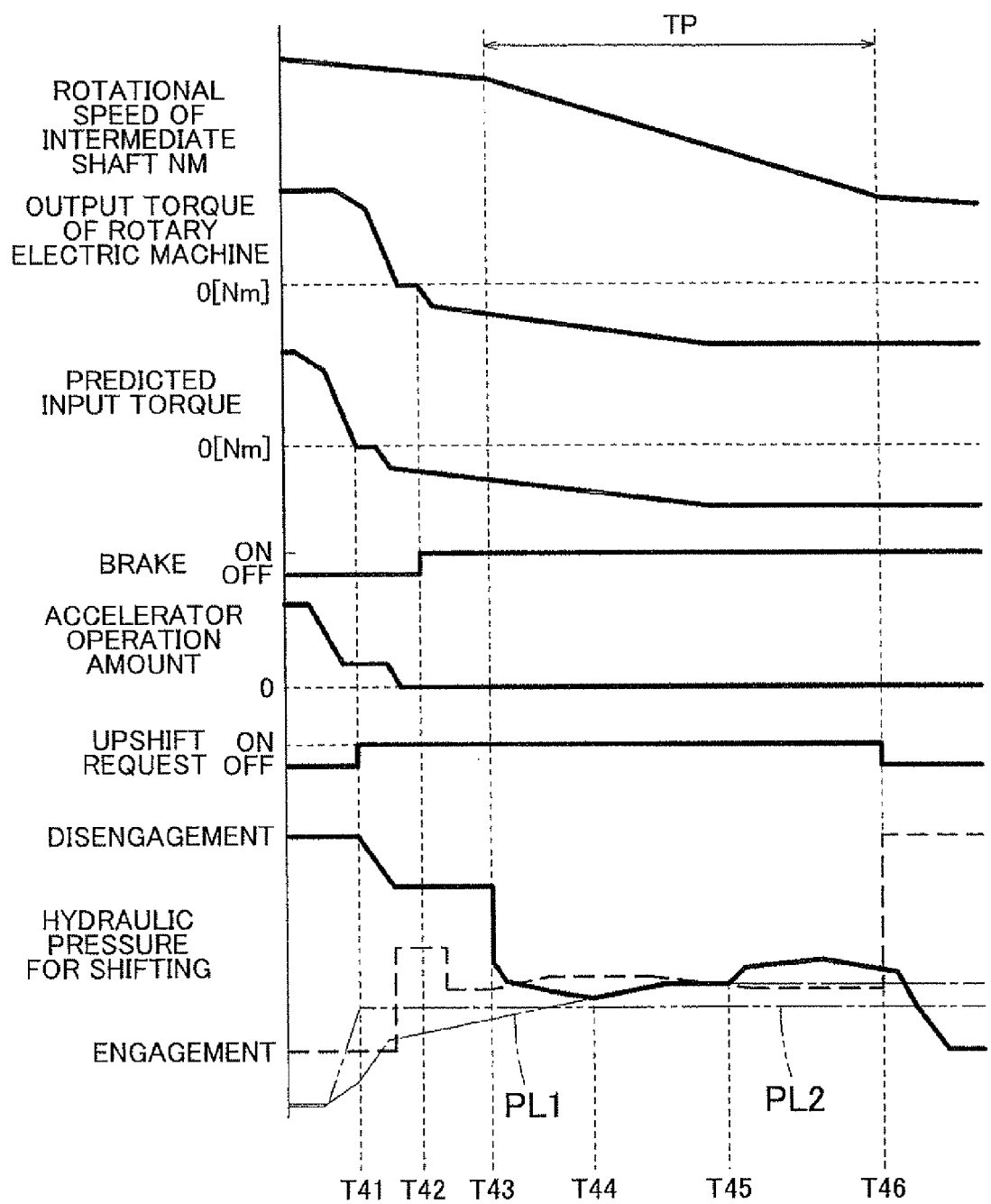
FIG. 17 is a timing chart illustrating an example of the special speed change control process according to the embodiment.

FIG. 17 is a timing chart showing still another exemplary case where a speed change operation is performed through the special speed change control. In the example, the predicted input torque PTi is varied at a level that is lower than the output torque of the rotary electric machine 12. Therefore, in the example shown in FIG. 17, the speed change mechanism 14 performs an upshift (power-off upshift) in the negative torque prediction established state in which the predicted input torque PTi, which is predicted to be input to the input shaft I the prediction determination reference time TSp later, is negative. Also in this case, the special speed change control transition conditions are satisfied, and thus the special speed change control is executed. That is, in the example, the vehicle is not brought to the small acceleration operation amount state with the accelerator operation amount maintained at a predetermined value that is equal to or more than zero at time T41, but is brought to the negative torque prediction established state with the predicted input torque becoming equal to or less than zero at time T41. Hence, the special speed change control is executed at and after time T41. The detailed content of the special speed change control is similar to that described with reference to FIG. 16. It should be noted that the example is different from the example of FIG. 16 in that the first limit hydraulic pressure PL1 is set on the basis of the predicted input torque PTi rather than the output torque (regenerative torque) of the rotary electric machine 12. The example is otherwise similar to the example of FIG. 16, and thus is not described in detail here.

Figure 18:
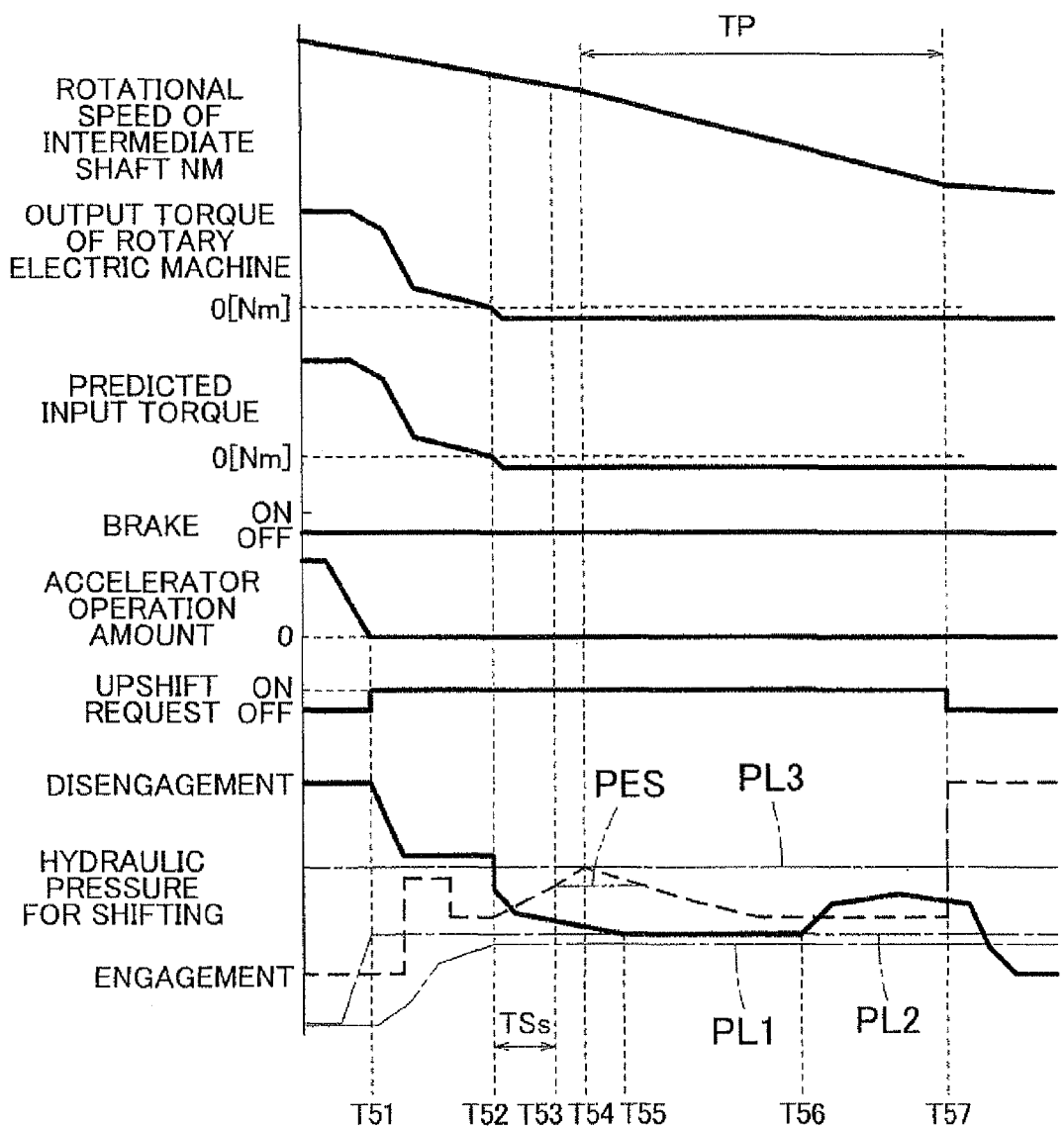
FIG. 18 is a timing chart illustrating an example of the special speed change control process according to the embodiment.

FIG. 18 is a timing chart showing still another exemplary case where a speed change operation is performed through the special speed change control. In the example, the predicted input torque PTi substantially coincides with the output torque of the rotary electric machine 12. In the example shown in FIG. 18, as with FIGS. 15 and 16, the speed change mechanism 14 performs an upshift (power-off upshift) in the small acceleration operation amount state in which the accelerator operation amount of the vehicle is equal to or less than a predetermined value. In this case, the special speed change control transition conditions are satisfied, and thus the special speed change control is executed. When the accelerator operation amount becomes zero at time T51, the output torque of the rotary electric machine 12 is gradually reduced to become negative at time T52, which causes the rotary electric machine 12 to perform regeneration (off upshift regeneration). At time T51, an upshift request is turned on. In the example, the second limit hydraulic pressure PL2 is higher than the first limit hydraulic pressure PL1 and the stroke end pressure Pse for the disengagement element over the entire speed change process TP. During a period from time T51 to time T52, the disengagement hydraulic pressure is kept at a pressure matching the output torque; and the engagement hydraulic pressure is maintained at a predetermined pressure after preliminary filling is completed. Thereafter, starting at time T52, the disengagement hydraulic pressure is lowered so as to maintain the disengagement element in the slipping state over the entire speed change process TP.

In the example, the rotational speed of the intermediate shaft M is not lowered to a degree at which the predetermined rotational speed difference ΔN1 is not produced for a while after time T52, at which the disengagement hydraulic pressure starts decreasing. That is, the disengagement element does not slip for a while after the disengagement hydraulic pressure is lowered. Thus, in the example, starting at time T53, at which a predetermined time (the slipping determination reference time TSs) has elapsed after the disengagement hydraulic pressure is lowered, the pressure increase correction control in which the engagement hydraulic pressure is further raised with respect to the engagement reference hydraulic pressure PES is performed. In FIG. 18, the engagement reference hydraulic pressure PBS before the pressure increase correction control is indicated by the double-dashed line. When it is detected at time T54 that the disengagement element has started slipping and the predetermined rotational speed difference ΔN1 is produced as a result of the pressure increase correction control, the engagement hydraulic pressure is gradually reduced by an amount by which the engagement hydraulic pressure has been raised through the pressure increase correction control at and after time T54 to lower the engagement hydraulic pressure to the engagement reference hydraulic pressure PES. In FIG. 18, the third limit hydraulic pressure PL3 is also shown in addition to the first limit hydraulic pressure PL1 and the second limit hydraulic pressure PL2. In the example, over the entire speed change process TP, the disengagement hydraulic pressure is maintained at a pressure that is less than the third limit hydraulic pressure PL3, and the upper limit of the disengagement hydraulic pressure is not restricted by the third limit hydraulic pressure PL3. While the special speed change control in the example has been described with the focus on the content of the pressure increase correction control, elements of the special speed change control in the example that have not been specifically mentioned are the same as those described with reference to FIGS. 15 to 17.

Figure 19:
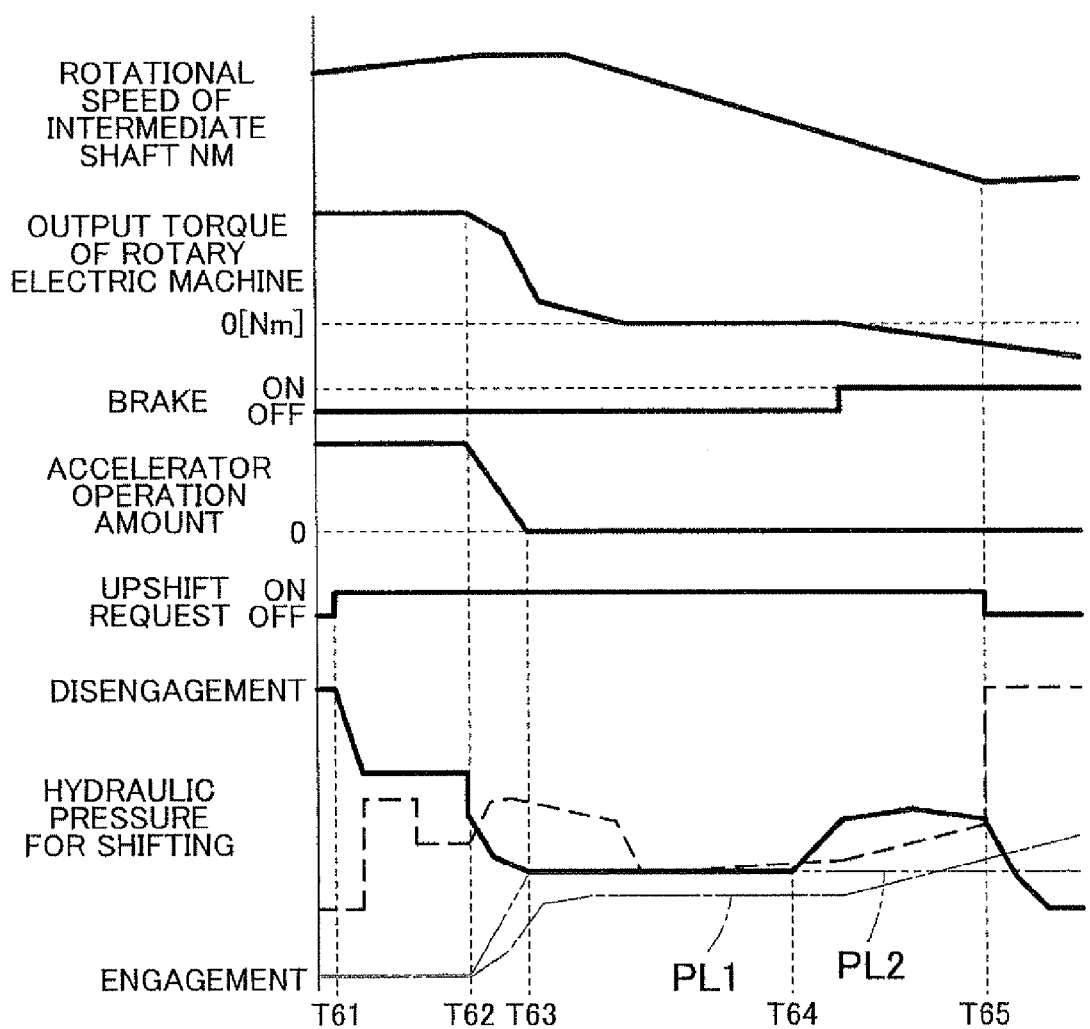
FIG. 19 is a timing chart illustrating an example of the speed change control process according to the embodiment.

FIG. 19 is a timing chart showing an exemplary case where a speed change operation is performed through a combination of the normal speed change control and the special speed change control. In the example shown in FIG. 19, the normal speed change control is performed initially, and the special speed change control is performed thereafter before the target shift speed after switching is established. In the example, at time T61, an upshift request is turned on with the accelerator operation amount maintained at a predetermined magnitude. During a period from time T61 to time T62, the disengagement hydraulic pressure is kept at a pressure matching the output torque, and the engagement hydraulic pressure is maintained at a predetermined pressure after preliminary filling is completed. Thereafter, the normal speed change control in which the disengagement hydraulic pressure is lowered rapidly to quickly disengage the disengagement element and in which the engagement hydraulic pressure is varied so as to vary the rotational speed NM of the intermediate shaft M at the predetermined target rotational acceleration AT is performed.

In the example, the accelerator operation amount becomes zero at time T63, which is before the normal speed change control is completed, so that the special speed change control transition conditions are satisfied posteriorly. Hence, the special speed change control is executed at and after time T63. As the accelerator operation amount becomes zero, the second limit hydraulic pressure PL2 becomes higher than the stroke end pressure Pse for the disengagement element. At and after time I63, the lower limit value of the disengagement hydraulic pressure is restricted by the second limit hydraulic pressure PL2 so that the disengagement element is maintained in the slipping state. Specifically, the variation rate control is executed during a period from time T63 to time T64, and the rotational speed control is executed during a period from time T64 to time T65. Thereafter, when the rotational speed difference ΔN2 becomes equal to or less than a predetermined value at time T65, the engagement hydraulic pressure is raised to the complete engagement pressure, and thereafter the disengagement hydraulic pressure is brought to zero quickly. The speed change operation is thus terminated.

Figure 20:
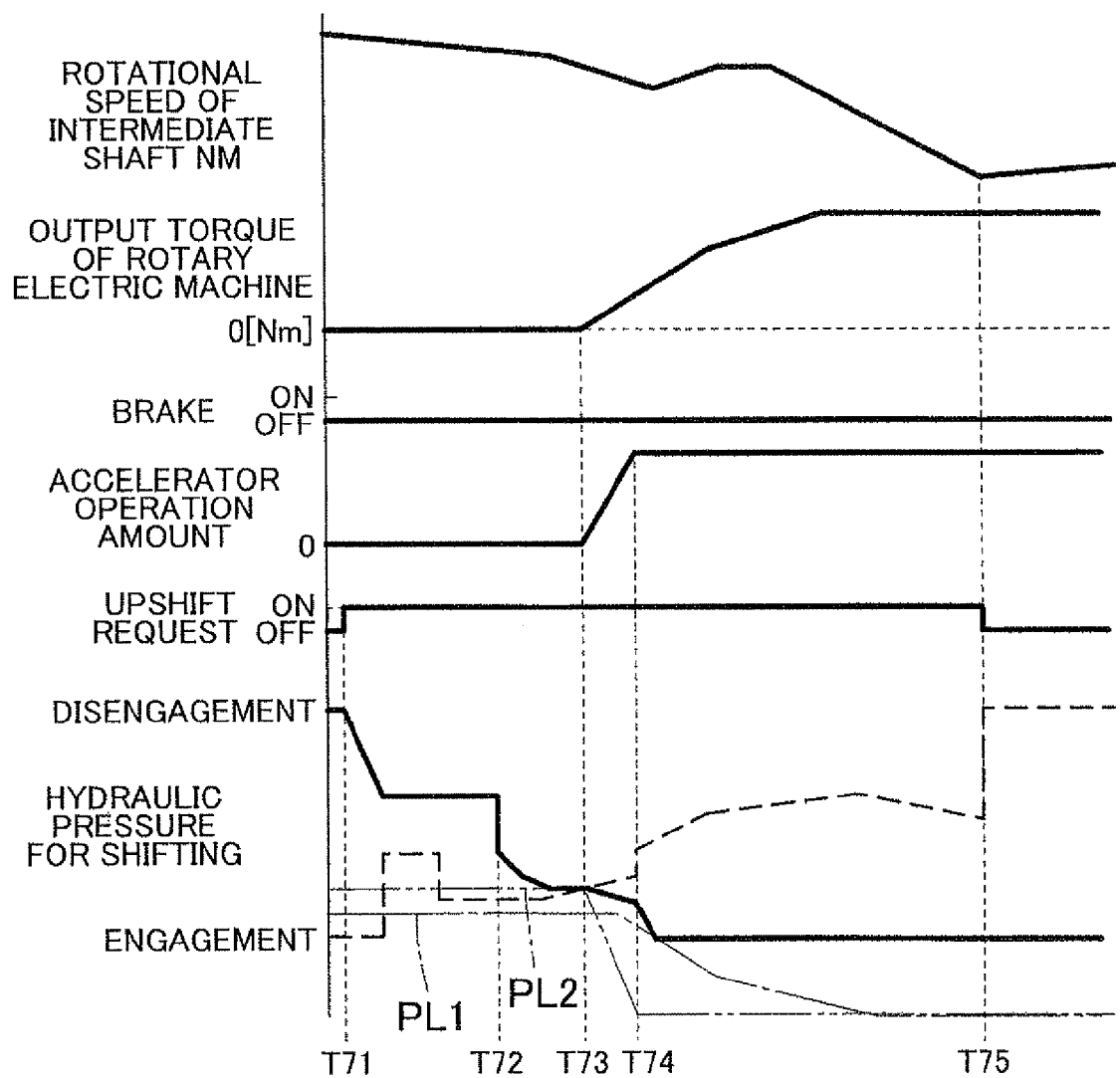
FIG. 20 is a timing chart illustrating an example of the speed change control process according to the embodiment.

FIG. 20 is a timing chart showing another exemplary case where a speed change operation is performed through a combination of the normal speed change control and the special speed change control. In the example shown in FIG. 20, the special speed change control is performed initially, and the normal speed change control is performed thereafter before the target shift speed after switching is established. In the example, at time T71, an upshift request is turned on in the small acceleration operation amount state in which the accelerator operation amount is equal to or less than a predetermined value. During a period from time T71 to time T72, the disengagement hydraulic pressure is kept at a pressure matching the output torque, and the engagement hydraulic pressure is maintained at a predetermined pressure after preliminary filling is completed. Thereafter, the special speed change control in which the disengagement hydraulic pressure is controlled so as to maintain the disengagement element in the slipping state is performed.

In the example, the accelerator pedal is depressed by the driver of the vehicle at time T73, which is before the special speed change control is completed, and the accelerator operation amount is raised to a predetermined value or more at time T74, which is at least immediately after time T73, so that the special speed change control transition conditions are not satisfied any more posteriorly. Hence, the normal speed change control is executed at and after time T74. That is, the disengagement hydraulic pressure is lowered rapidly to quickly disengage the disengagement element, and the engagement hydraulic pressure is varied so as to vary the rotational speed NM of the intermediate shaft M at the predetermined target rotational acceleration AT. Thereafter, when the rotational speed difference ΔN2 becomes equal to or less than a predetermined value at time T75, the engagement hydraulic pressure is raised to the complete engagement pressure. The speed change operation is thus terminated.

In the special speed change control which has been described above, the disengagement element is not completely engaged or disengaged but maintained in the slipping state over the entire speed change process TP. Thus, according to the special speed change control of the present invention, the switching control section 36 can control the rotational speed NM of the intermediate shaft M during a speed change operation basically by only controlling the disengagement hydraulic pressure. Then, by maintaining the disengagement element in the slipping state over the entire speed change process TP, it is possible to maintain a state in which a part of the rotational drive force transferred from the wheels 16 is transferred to the intermediate shaft M and the input shaft I drivably coupled to the intermediate shaft M via the disengagement element over the entire speed change process TP. Therefore, even if the rotary electric machine 12 is caused to output relatively high negative torque in order to perform regenerative braking, abrupt variations in rotational speed of the input shaft I can be suppressed with the high negative torque output by the rotary electric machine 12 supplemented with a part the rotational drive force transferred from the wheels 16. FIGS. 16 and 17 show that the rotational speed NM of the intermediate shaft M is varied gently over the entire speed change process TP. Hence, occurrence of a speed change shock can be suppressed. Since occurrence of a speed change shock can be suppressed basically by just controlling the disengagement hydraulic pressure, it is not necessary to restrict the magnitude of the negative torque (regenerative torque) output by the rotary electric machine 12 unlike the case where the disengagement element is completely disengaged relatively quickly in the initial stage of the speed change process TP. Hence, the energy efficiency can be maintained at a high level without causing an inconvenience such as a reduction in energy to be regenerated.

In FIG. 16, variations in rotational speed NM of the intermediate shaft M for a case where the disengagement element is disengaged quickly (see FIG. 14), as in the normal speed change control, even in the case where the rotary electric machine 12 is outputting negative torque to perform regeneration are indicated by the broken line for comparison. In the example, the rotational speed NM of the input shaft I is lowered abruptly to fall equal to or less than the post-switching target rotational speed NT2 in the initial stage of the speed change process TP. In the case where the rotational speed NM of the intermediate shaft M is thus varied abruptly, relatively large torque fluctuations tend to be transferred to the output shaft O, which is highly likely to cause a speed change shock. In the case where the special speed change control is performed, in contrast, the rotational speed NM of the intermediate shaft M is varied gently over the entire speed change process TP as described above, which effectively suppresses occurrence of a speed change shock.

In the embodiment, the special speed change control transition conditions include a condition that the vehicle is in the small acceleration operation amount state, in which the accelerator operation amount is equal to or less than a predetermined value, or a condition that the vehicle is in the negative torque prediction established state, in which the predicted input torque is negative, in combination with a condition that the target shift speed for the speed change mechanism 14 is upshifted. Hence, the special speed change control transition condition can be satisfied not only in the case where the accelerator operation amount actually becomes equal to or less than a predetermined value but also in the case where it is predicted that the input torque Ti becomes negative a predetermined time (the prediction determination reference time TSp) later. This allows the special speed change control to be started on the basis of variations in predicted input torque PTi even in the case where the accelerator operation amount is reduced gently and the establishment of the small acceleration operation amount state is delayed because, for example, the driver of the vehicle releases the accelerator pedal slowly. In this case, further, during execution of the special speed change control, the first limit hydraulic pressure PL1 is set in accordance with the predicted input torque PTi rather than the actual output torque (regenerative torque) of the rotary electric machine 12. Thus, the lower limit of the disengagement hydraulic pressure can be restricted by the first limit hydraulic pressure PL1 matching the predicted input torque PTi before the actual output torque of the rotary electric machine falls equal to or less than zero, and the energy efficiency can be maintained at a high level.

In the embodiment, in addition, during the special speed change control and in the small acceleration operation amount state, the disengagement hydraulic pressure is restricted to a pressure that is equal to or more than the first limit hydraulic pressure PL1 in the case where the first limit hydraulic pressure PL1, which becomes higher as the output torque of the rotary electric machine 12 becomes higher in the negative direction (as the regenerative torque becomes higher), is higher than the second limit hydraulic pressure PL2. Consequently, during the special speed change control and over the entire speed change process TP, the disengagement element is maintained in the slipping state, and the amount of slipping of the disengagement element is adjusted appropriately in accordance with the negative torque (regenerative torque) of the rotary electric machine 12. That is, the first limit hydraulic pressure PL1 is increased to reduce the amount of slipping of the disengagement element as the regenerative torque is higher, and the first limit hydraulic pressure PL1 is reduced to increase the amount of slipping of the disengagement element as the regenerative torque is lower. This makes it possible to reliably suppress occurrence of a speed change shock in correspondence with variations in output torque of the rotary electric machine 12. Also in the negative torque prediction established state, it is possible to reliably suppress occurrence of a speed change shock in correspondence with variations in predicted input torque PTi.

In the special speed change control, the disengagement element is maintained in the slipping state over the entire speed change process TP. Thus, in the case where generative braking is not performed and the rotary electric machine 12 does not output negative torque, or in the case where the rotary electric machine 12 does output negative torque but with a relatively small magnitude, the actual rotational speed NM of the intermediate shaft M may be lowered slowly to extend the speed change time uselessly with respect to the target speed change time Tt. Thus, in the embodiment, the engagement hydraulic pressure is varied such that the actual rotational acceleration AM of the intermediate shaft M follows the target rotational acceleration AT through the first engagement control in coordination with maintaining the disengagement element in the slipping state. More specifically, the engagement hydraulic pressure is varied to rise, be constant, and lower along with the progress of the speed change process TP over a variation range that is wider as the absolute value of the negative torque (regenerative torque) output by the rotary electric machine 12 is smaller. This makes it possible to compensate for a decrease in rotational speed NM of the intermediate shaft M, which tends to be slow when the disengagement element is maintained in the slipping state, with a rise in engagement hydraulic pressure, which enables a swift speed change operation. The effect of the first engagement control is exhibited more distinctly as the absolute value of the negative torque (regenerative torque) output by the rotary electric machine 12 is smaller.

In the embodiment, in addition, in the case where slipping of the disengagement element is not detected within the predetermined slipping determination reference time TSs with reference to the time point when the disengagement hydraulic pressure control section 37 starts lowering the disengagement hydraulic pressure at the start of the special speed change control, the engagement hydraulic pressure control section 38 performs the pressure increase correction control in which the engagement hydraulic pressure is raised until slipping of the disengagement element is detected. By employing the configuration in which the pressure increase correction control is executed, slipping of the disengagement element and lowering of the rotational speed of the intermediate shaft M can be promoted even in the case where there is a delay in a decrease in rotational speed of the intermediate shaft M with only normal engagement hydraulic pressure control in the first engagement control.

In the variation rate control in the special speed change control, the disengagement hydraulic pressure is lowered at a variation rate matching the magnitude of the regenerative torque output by the rotary electric machine 12. In the embodiment, the hydraulic pressure is lowered at a variation rate of which absolute value is smaller, as the regenerative torque is higher, and the disengagement hydraulic pressure is lowered at a variation rate of which absolute value is larger, as the regenerative torque is lower. According to the configuration of the embodiment, as the regenerative torque is higher, the disengagement hydraulic pressure is lowered more gently, and thus the rotational drive force from the wheels 16 transferred to the intermediate shaft M and the input shaft I via the disengagement element becomes larger to appropriately compensate for the high negative torque of the rotary electric machine 12. Hence, abrupt variations in rotational speed of the intermediate shaft M can be suppressed appropriately through a relatively simple process.

In the rotational speed control in the special speed change control, further, the target rotational speed NT and the target rotational acceleration AT of the intermediate shaft M at each time are determined on the basis of the target speed change time Tt and the rotational speed variation range W, and the disengagement hydraulic pressure is varied such that the actual rotational acceleration AM of the intermediate shaft M follows the target rotational acceleration AT at each time point. Thus, the rotational acceleration AM (the variation rate of the rotational speed over time) of the intermediate shaft M, which is deeply associated with occurrence of a speed change shock, can be controlled appropriately. Hence, abrupt variations in rotational speed of the intermediate shaft M can be more reliably suppressed, which more reliably suppresses occurrence of a speed change shock. In the embodiment, further, the target rotational speed NT at each time point is set such that the rotational speed of the intermediate shaft M draws a track over time represented by a quadratic curve from a time point when the rotational speed control is started to a time point when the speed change operation is completed. In this case, the absolute value of the target rotational acceleration AT at each time point becomes gradually smaller (to finally become zero) toward the termination of the speed change operation. Thus, the rotational speed NM of the intermediate shaft M can be smoothly brought to the post-switching target rotational speed NT2 in the latter stage of the speed change process TP. Hence, occurrence of a speed change shock can be more reliably suppressed.

Other Embodiments

Lastly, control devices according to other embodiments of the present invention will be described. A characteristic configuration described in each of the following embodiments may be applied not only to that particular embodiment but also in combination with a characteristic configuration described in any other embodiment unless any contradiction occurs.

(1) In the above embodiment, in the pressure increase correction control, the engagement hydraulic pressure control section 38 raises the engagement hydraulic pressure at a constant pressure increase variation rate with respect to the engagement reference hydraulic pressure PES. However, the present invention is not limited thereto. That is, in one suitable embodiment of the present invention, the engagement hydraulic pressure may be raised at a pressure increase variation rate that is varied in accordance with the elapsed time since the engagement hydraulic pressure starts rising, for example. In this case, the engagement hydraulic pressure may be raised at a pressure increase variation rate that becomes higher as the elapsed time since the engagement hydraulic pressure starts rising becomes longer, for example.

(2) In the above embodiment, in the pressure increase correction control, after slipping of the disengagement element is detected, the engagement hydraulic pressure is lowered to the engagement reference hydraulic pressure PES before the termination of the speed change process TP. However, the present invention is not limited thereto. That is, in one preferred embodiment of the present invention, the engagement hydraulic pressure may be lowered to a predetermined pressure that is higher than the engagement reference hydraulic pressure PBS, for example. In this case, the predetermined pressure is preferably set to a pressure that can at least keep the tie-up rate equal to or less than a predetermined value.

(3) In the above embodiment, in the pressure increase correction control, after slipping of the disengagement element is detected, the engagement hydraulic pressure is gradually lowered in accordance with the predicted time (Tb−Tx) from each time point to the pressure increase termination time point EP. However, the present invention is not limited thereto. That is, in one preferred embodiment of the present invention, after slipping of the disengagement element is detected, the engagement hydraulic pressure may be gradually lowered in accordance with the predicted time (Tb) from each time point to the time point when the speed change process TP is terminated, for example. In another preferred embodiment of the present invention, after slipping of the disengagement element is detected, the engagement hydraulic pressure may be gradually lowered at a constant pressure reduction variation rate irrespective of the predicted time (Tb−Tx) from each time point to the pressure increase termination time point EP.

(4) In the above embodiment, the input torque prediction section 40 derives the predicted input torque PTi after the prediction determination reference time TSp, which is set to a predetermined value, on the basis of the current input torque Ti and the currently latest predicted torque variation rate QTi. However, the present invention is not limited thereto. That is, in one preferred embodiment of the present invention, the input torque prediction section 40 may be configured to derive the predicted input torque PTi on the basis of the current input torque Ti and the input torque variation rate RTi, for example. Such a configuration is equivalent to the above embodiment in which the weighting coefficient k is set to "1". In this case, the prediction determination reference time TSp may be set to be variable in accordance with the vehicle speed or the output torque of the rotary electric machine 12, for example, rather than be fixed as in the above embodiment.

(5) In the above embodiment, in the case where the special speed change control transition conditions are satisfied in the negative torque prediction established state, the limit hydraulic pressure determination section 39 determines the first limit hydraulic pressure PL1 in accordance with the predicted input torque PTi. However, the present invention is not limited thereto. That is, in one preferred embodiment of the present invention, the limit hydraulic pressure determination section 39 may be configured to determine the first limit hydraulic pressure PL1 in accordance with the output torque (regenerative torque) of the rotary electric machine 12 in such a case. In this case, the predicted input torque PTi derived by the input torque prediction section 40 is only used to determine the start of the special speed change control. In the above embodiment, meanwhile, in the case where the special speed change control transition conditions are satisfied in the small acceleration operation amount state, the limit hydraulic pressure determination section 39 determines the first limit hydraulic pressure PL1 in accordance with the output torque (regenerative torque) of the rotary electric machine 12. However, the present invention is not limited thereto. That is, in one preferred embodiment of the present invention, the limit hydraulic pressure determination section 39 may be configured to determine the first limit hydraulic pressure PL1 in accordance with the predicted input torque PTi in such a case.

(6) In the above embodiment, both the first limit hydraulic pressure PL1 and the second limit hydraulic pressure PL2 are set, and the higher one of the two limit hydraulic pressures is used as the lower limit value of the disengagement hydraulic pressure. However, the present invention is not limited thereto. That is, in one preferred embodiment of the present invention, only one of the first limit hydraulic pressure PL1 and the second limit hydraulic pressure PL2 may be set, and may be used as it is as the lower limit value of the disengagement hydraulic pressure. In the above embodiment, meanwhile, the third limit hydraulic pressure PL3 is set as the upper limit value of the disengagement hydraulic pressure. However, the present invention is not limited thereto. That is, in one preferred embodiment of the present invention, no such third limit hydraulic pressure PL3 may be set.

(7) In the above embodiment, the first limit hydraulic pressure PL1 is set to a value matching the output torque of the rotary electric machine 12 or the predicted input torque PTi. However, the present invention is not limited thereto. That is, the first limit hydraulic pressure PL1 is preferably set to a value that is at least equal to or more than the stroke end pressure Pse for the disengagement element in the case where the rotary electric machine 12 outputs negative torque (regenerative torque) or the predicted input torque PTi is negative. In one suitable embodiment of the present invention, the first limit hydraulic pressure PL1 may be set to a value that is equal to or more than the stroke end pressure Pse for the disengagement element and that is fixed irrespective of the magnitude of the negative torque of the rotary electric machine 12 or the magnitude of the predicted input torque PTi, for example.

(8) In the above embodiment, the second limit hydraulic pressure PL2 is set to a value that is equal to or more than the stroke end pressure Pse for the disengagement element in the small acceleration operation amount state in which the accelerator operation amount is equal to or less than a predetermined value, and that becomes smaller as the accelerator operation amount becomes larger. However, the present invention is not limited thereto. That is, the second limit hydraulic pressure PL2 is preferably set to a value that is at least equal to or more than the stroke end pressure Pse for the disengagement element in the small acceleration operation amount state. In one suitable embodiment of the present invention, the second limit hydraulic pressure PL2 may be set to a value that is equal to or more than the stroke end pressure Pse for the disengagement element and that is fixed irrespective of the magnitude of the accelerator operation amount, for example.

(9) In the above embodiment, in the disengagement special speed change control, the variation rate control is executed in the initial stage of the speed change process TP, and the rotational speed control is performed when the speed change operation progresses by 50% (the degree of progress a becomes 0.5) to reach the switching point. However, the present invention is not limited thereto. That is, the switching point which defines the timing for a transition from the variation rate control to the rotational speed control may be set as desired. In the case where the switching point is set on the basis of the rotational speed NM of the intermediate shaft M as in the embodiment, the set value may be changed appropriately between 0% ($\alpha=0$) and 100% ($\alpha=1$). In the case where the switching point is set to 0% ($\alpha=0$), only the rotational speed control is executed over the entire speed change process TP. In this case, it is possible to both suppress occurrence of a speed change shock and improve the energy efficiency by precisely controlling and appropriately varying the rotational acceleration AM and the rotational speed NM of the intermediate shaft M at each time point in the entire speed change process TP. In the case where the switching point is set to 100% ($\alpha=1$), meanwhile, only the variation rate control is executed over the entire speed change process TR. In this case, it is possible to both suppress occurrence of a speed change shock and improve the energy efficiency through relatively simple control. It is also suitable that the switching point is set on the basis of the elapsed time since the start of the variation rate control, the level of the disengagement hydraulic pressure, or the like. For example, the switching point may be set to a time point when a predetermined time has elapsed since the variation rate control is started, a time point when the level of the disengagement hydraulic pressure has reached a predetermined pressure, or the like, and the rotational speed control may be executed at and after the switching point.

(10) In the above embodiment, in the first engagement control of the engagement special speed change control, the engagement hydraulic pressure is varied over a variation range matching the negative torque output by the rotary electric machine 12. However, the present invention is not limited thereto. That is, in one preferred embodiment of the present invention, in the first engagement control, the engagement hydraulic pressure may be controlled so as to be varied over a constant variation range irrespective of the magnitude of the negative torque (regenerative torque) output by the rotary electric machine 12, for example. Alternatively, in another preferred embodiment of the present invention, the engagement hydraulic pressure may be varied over a variation range matching the predicted input torque PTi.

(11) In the above embodiment, the first limit hydraulic pressure PL1, the second limit hydraulic pressure PL2, and the variation coefficient G are determined in accordance with a predetermined argument on the basis of the first limit hydraulic pressure map (a part of the limit hydraulic pressure map 45), the second limit hydraulic pressure map (a part of the limit hydraulic pressure map 45), and the variation coefficient map 46, respectively, stored in the memory 41. However, the present invention is not limited thereto. That is, in one preferred embodiment of the present invention, some or all of the first limit hydraulic pressure PL1, the second limit hydraulic pressure PL2, and the variation coefficient G may be determined on the basis of a predetermined computation formula.

(12) In the above embodiment, in the rotational speed control of the disengagement special speed change control, the disengagement hydraulic pressure is varied such that the actual rotational acceleration AM of the intermediate shaft M acquired by the rotational acceleration acquisition section 34 follows the target rotational acceleration AT at each time point. However, the present invention is not limited thereto. That is, in one suitable embodiment of the present invention, the rotational speed NM, rather than the rotational acceleration AM, may be used as a reference, for example, and the disengagement hydraulic pressure may be varied such that the actual rotational acceleration NM of the intermediate shaft M detected by the intermediate shaft rotational speed sensor Set follows the target rotational speed NT at each time point.

(13) In the above embodiment, in the rotational speed control of the disengagement special speed change control, the target rotational speed NT at each time point is set to draw a track over time represented by a quadratic curve. However, the present invention is not limited thereto. That is, in one suitable embodiment of the present invention, the target rotational acceleration AT at each time point may be set to draw a track over time represented by a line, a cubic or higher-order curve, a hyperbolic curve, or the like as long as the absolute value of the target rotational acceleration AT becomes gradually smaller toward the termination of the speed change operation.

(14) In the above embodiment, the speed change mechanism 14 includes three shift speeds (the first speed, the second speed, and the third speed) with different speed ratios. However, the present invention is not limited thereto. That is, the number of shift speeds is not specifically limited as long as the speed change mechanism 14 is a stepped speed change mechanism. In one suitable embodiment of the present invention, the speed change mechanism 14 may include two or four or more shift speeds.

(15) In the above embodiment, in the vehicle drive device 1, the input shaft I, the intermediate shaft M, and the output shaft O are all disposed coaxially with each other to form a single-axis configuration. However, the present invention is not limited thereto. That is, in one suitable embodiment of the present invention, in the vehicle drive device 1, the input shaft I, the intermediate shaft M, and the output shaft O may be disposed non-coaxially with each other, for example.

(16) In the above embodiment, the special speed change control is executed during a power-off upshift (including off-upshift regeneration) in which the speed change mechanism 14 performs an upshift in the small acceleration operation amount state. However, the present invention is not limited thereto. That is, in one preferred embodiment of the present invention, the special speed change control may be executed during a power-on downshift, for example. Alternatively, it is also suitable that the special speed change control is executed during a power-on upshift or a power-off downshift. In these cases, the transmission device 2 may not necessarily include the rotary electric machine 12 serving as a drive force source for the vehicle. In one suitable embodiment of the present invention, the transmission device 2 may be drivably coupled only to the engine 1 serving as a drive force source for the vehicle. Alternatively, the transmission device 2 may not necessarily be drivably coupled to the engine 11 serving as a drive force source for the vehicle. In another preferred embodiment of the present invention, the transmission device 2 may include only the rotary electric machine 12 serving as a drive force source for the vehicle, and only the rotary electric machine 12 may be drivably coupled to the input shaft I.

(17) Also regarding other configurations, the embodiment described herein is illustrative in all respects, and the present invention is not limited thereto. That is, it is a matter of course that a configuration obtained by appropriately altering part of a configuration not described in the claims of the present invention also falls within the technical scope of the present invention as long as the obtained configuration includes a configuration described in the claims or a configuration equivalent thereto.

The present invention may be suitably applied to a control device for controlling a transmission device including an input member drivably coupled to a drive force source, an output member drivably coupled to wheels, and a speed change mechanism that has a plurality of friction engagement elements that are controllably engaged and disengaged to switch between a plurality of shift speeds, and that outputs rotation of the input member to the output member while changing the rotational speed with a speed ratio of each shift speed.

What is claimed is:

1. A control device for controlling a transmission device that includes an input member drivably coupled to a drive force source, an output member drivably coupled to wheels, and a speed change mechanism that has a plurality of friction engagement elements that are controllably engaged and disengaged to switch between a plurality of shift speeds, and that outputs rotation of the input member to the output member while changing a rotational speed with a speed ratio of each shift speed, wherein when the speed change mechanism performs switching to a shift speed with a different speed ratio, special speed change control is executed in which a disengagement hydraulic pressure, which is a hydraulic pressure of hydraulic oil for the disengagement element that is a friction engagement element to be disengaged, is lowered to cause a disengagement element to slip, and in which the disengagement element is maintained in a slipping state over an entire speed change process, which extends from a time point when the disengagement element starts slipping to a time point when a rotational speed obtained by multiplying a rotational speed of the output member by a speed ratio after the switching between shift speeds is synchronized with a rotational speed of the input member, and in the case where slipping of the disengagement element is not detected within a predetermined time after the disengagement hydraulic pressure is lowered at start of the special speed change control, pressure increase correction is performed in which an engagement hydraulic pressure, which is a hydraulic pressure of hydraulic oil for an engagement element that is a friction engagement element to be engaged, is raised until slipping of the disengagement element is detected.

2. The control device according to claim 1, wherein in the pressure increase correction, the engagement hydraulic pressure is raised with respect to an engagement reference hydraulic pressure serving as a reference value of the engagement hydraulic pressure during the special speed change control, and after slipping of the disengagement element is detected, the engagement hydraulic pressure is lowered to the engagement reference hydraulic pressure before termination of the speed change process.

3. The control device according to claim 2, wherein the engagement hydraulic pressure is gradually lowered in accordance with a predicted time from a current time point to a predetermined pressure increase termination time point set before the termination of the speed change process such that the engagement hydraulic pressure becomes the engagement reference hydraulic pressure at the pressure increase termination time point.

4. The control device according to claim 3, wherein a target rotational speed variation rate of the input member is determined on the basis of a target speed change time set in advance and representing a target time within which the switching between shift speeds is to be performed and a rotational speed variation range representing a difference between rotational speeds of the input member before and after the switching between shift speeds, and the engagement reference hydraulic pressure is varied in coordination with a decrease in the disengagement hydraulic pressure such that an actual rotational speed variation rate of the input member follows the target rotational speed variation rate.

5. The control device according to claim 4, wherein the transmission device includes a rotary electric machine serving as the drive force source, a reference hydraulic pressure variation amount required to vary the rotational speed of the input member at the target rotational speed variation rate is determined on the basis of the target rotational speed variation rate, and the engagement reference hydraulic pressure is varied in accordance with a degree of progress of the speed change process and output torque of the rotary electric machine on the basis of the reference hydraulic pressure variation amount.

6. The control device according to claim 5, wherein the engagement reference hydraulic pressure is varied, with reference to the engagement hydraulic pressure at start of the speed change process, on the basis of a predetermined variation coefficient, which is set in advance in accordance with the degree of progress of the speed change process and the output torque of the rotary electric machine, and the reference hydraulic pressure variation amount, and the variation coefficient is set to a value that becomes larger as the speed change process progresses in at least a first stage of a plurality of stages set in accordance with the degree of progress of the speed change process, and that becomes smaller as the speed change process progresses in at least a last stage of the plurality of stages.

7. The control device according to claim 2, wherein a target rotational speed variation rate of the input member is determined on the basis of a target speed change time set in advance and representing a target time within which the switching between shift speeds is to be performed and a rotational speed variation range representing a difference between rotational speeds of the input member before and after the switching between shift speeds, and the engagement reference hydraulic pressure is varied in coordination with a decrease in the disengagement hydraulic pressure such that an actual rotational speed variation rate of the input member follows the target rotational speed variation rate.

8. The control device according to claim 7, wherein the transmission device includes a rotary electric machine serving as the drive force source, a reference hydraulic pressure variation amount required to vary the rotational speed of the input member at the target rotational speed variation rate is determined on the basis of the target rotational speed variation rate, and the engagement reference hydraulic pressure is varied in accordance with a degree of progress of the speed change process and output torque of the rotary electric machine on the basis of the reference hydraulic pressure variation amount.

9. The control device according to claim 8, wherein
the engagement reference hydraulic pressure is varied, with reference to the engagement hydraulic pressure at start of the speed change process, on the basis of a predetermined variation coefficient, which is set in advance in accordance with the degree of progress of the speed change process and the output torque of the rotary electric machine, and the reference hydraulic pressure variation amount, and the variation coefficient is set to a value that becomes larger as the speed change process progresses in at least a first stage of a plurality of stages set in accordance with the degree of progress of the speed change process, and that becomes smaller as the speed change process progresses in at least a last stage of the plurality of stages.

10. The control device according to claim 1, wherein
in the special speed change control, the disengagement hydraulic pressure is restricted to be equal to or less than a disengagement upper limit hydraulic pressure set as an upper limit value of the disengagement hydraulic pressure during the special speed change control.

11. The control device according to claim 1, wherein
the transmission device includes a rotary electric machine serving as the drive force source, and
variation rate control is executed in which the disengagement hydraulic pressure is reduced at a pressure reduction variation rate matching a magnitude of the output torque of the rotary electric machine.

12. The control device according to claim 1, wherein
the transmission device includes a rotary electric machine serving as the drive force source,
in an initial stage of the speed change process, variation rate control is executed in which the disengagement hydraulic pressure is reduced at a pressure reduction variation rate matching a magnitude of the output torque of the rotary electric machine, and
after the variation rate control is executed, and at and after a predetermined switching point, rotational speed control is executed in which the disengagement hydraulic pressure is varied such that the rotational speed of the input member becomes a target rotational speed at each time point after the variation rate control.

13. The control device according to claim 1, wherein
the transmission device includes, as the drive force source, a rotary electric machine capable of producing regenerative torque on the basis of a request to decelerate a vehicle, and
the special speed change control is executed during off-upshift regeneration in which the speed change mechanism performs switching to a shift speed with a lower speed ratio in a small acceleration operation amount state where an accelerator operation amount of the vehicle is equal to or less than a predetermined value, and in a state where the rotary electric machine produces regenerative torque.

* * * * *